Oct. 30, 1951 W. W. LOGAN 2,573,208
MOTOR ANALYZER
Filed May 2, 1946 11 Sheets-Sheet 1
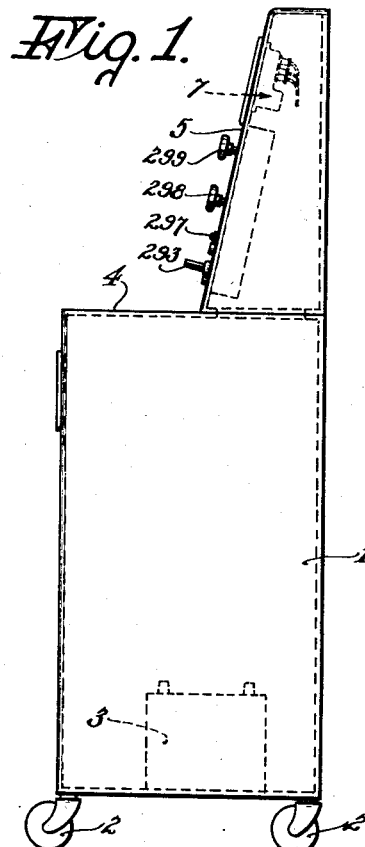
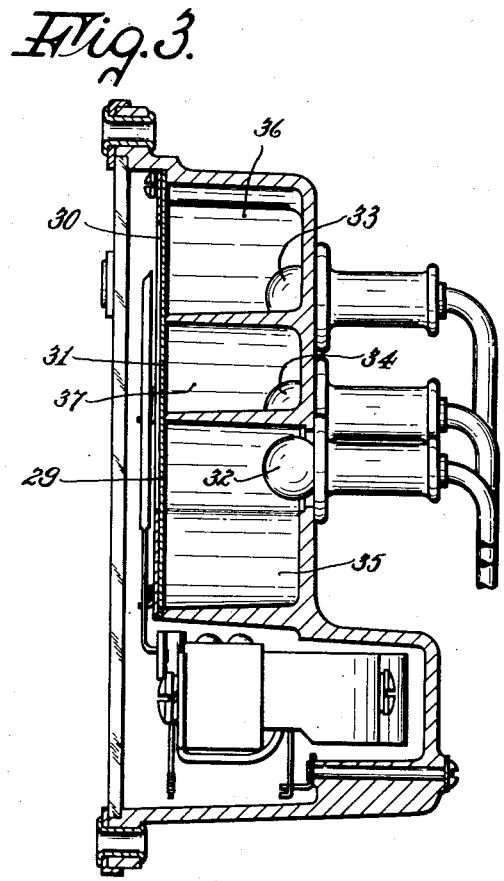
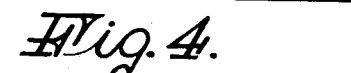
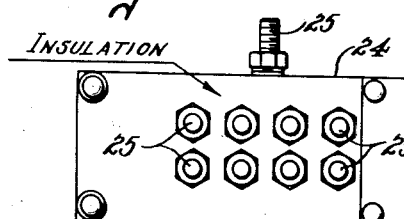
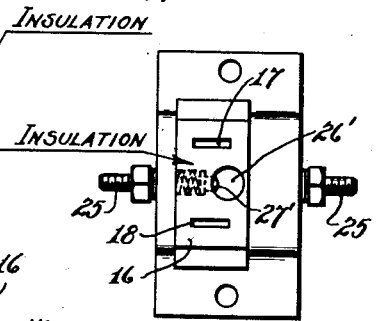
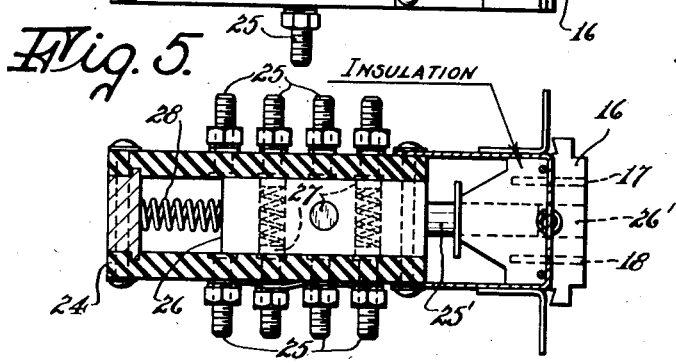
INVENTOR
WILLIAM W. LOGAN
BY Chapin & Neal
ATTORNEYS

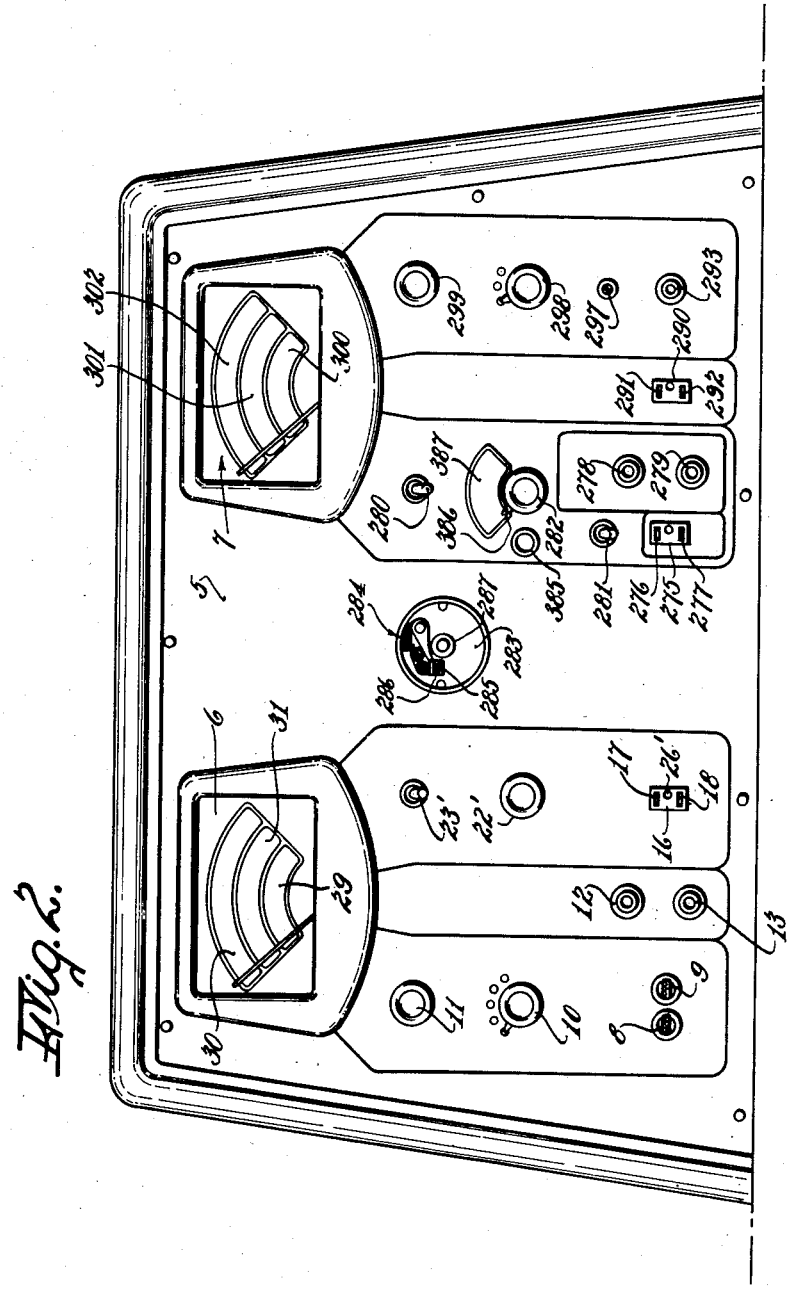

Oct. 30, 1951 W. W. LOGAN 2,573,208
MOTOR ANALYZER
Filed May 2, 1946 11 Sheets-Sheet 3

INVENTOR
WILLIAM W. LOGAN
BY Chapin & Neal
ATTORNEYS

Oct. 30, 1951 W. W. LOGAN 2,573,208
MOTOR ANALYZER
Filed May 2, 1946 11 Sheets-Sheet 6

INVENTOR
WILLIAM W. LOGAN
BY Chapin & Neal
ATTORNEYS

INVENTOR
WILLIAM W. LOGAN
BY Chapin & Neal
ATTORNEYS

Patented Oct. 30, 1951

2,573,208

UNITED STATES PATENT OFFICE 2,573,208

MOTOR ANALYZER

William W. Logan, East Orange, N. J., assignor, by mesne assignments, to Atlas Supply Company, Newark, N. J., a corporation of Delaware Application May 2, 1946, Serial No. 666,786

5 Claims. (Cl. 175—183)

This invention relates to improvements in motor analyzers, such as are used to test automobile or other internal combusition engines in order to determine what adjustments, repairs, and replacements are advisible and to aid in "tuning up" engine performance.

Various motor analyzers are known and used in the prior art. They have been developed as portable apparatus, to make many tests on different parts of the same motor. For example in "tune up" work, one wants to test the condition of the condenser, the operation of the breaker points, the timing of such operation, the high and low tension windings of the ignition coil, the spark plugs, and the nature of the exhaust gas to indicate needed items of the tune up work. These are some but not all of the tests used. They are very common ones. Different kinds of test circuits are in use to make the named tests. Prior art motor analyzers used to make these tests, considering them as examples, are expensive, difficult to use properly, and liable to expensive damage by misuse.

The purpose of the invention is to lower the cost of an efficient motor analyzer, make it easier to use properly, and provide a form less liable to damage from misuse. The comparison is with motor analyzers of the prior art now in use. The way the motor analyzer is improved pertains to the interlocking of test circuits and to an associated lamp indicating system with the result, among others, that test circuits will not be damaged in the old way, workmen will be induced to use the analyzer in the proper way and the testing work may be done with less training required to make proper use of this motor analyzer as compared to others of the prior art.

A particular purpose of the invention is to provide a motor analyzer adapted for wide use at retail filling stations. The idea is to facilitate good motor "tune up" work and prompt correction of minor motor trouble by attendants at these stations. Other troubles will be located by the tests and the major ones referred for later attention. This plan for service station work, will be related to some of the features seen from the detailed disclosure.

An example of the improved motor analyzer and the way to make and use the invention is shown from the drawings.

Fig. 1 is a side elevational view of the cabinet containing the motor analyzer of this invention;

Fig. 2 is a front elevational view of the instrument panel on the cabinet;

Fig. 3 is a cross sectional view of one of the meters mounted on the instrument panel, showing the scale signaling means including signal lamps for the meter;

Figs. 4, 5, 6 and 7 are top plan, sectional elevational, end elevational, and bottom plan views, respectively, of a typical form of gang switch for use with the invention;

Figure 8:
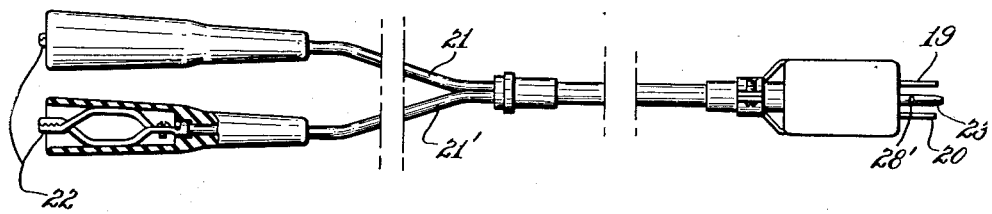
Figs. 8, 9 and 10 are views showing the various forms of test leads for use with the invention.

The motor analyzer of the example illustrated, includes a portable cabinet 1 on casters 2. It can be drawn alongside of an automobile and it carries with it all the things wanted for testing work as will be explained. The lower part contains a storage battery 3 and has a work shelf 4 at convenient height. The upper part displays the large instrument panel 5 of Fig. 2, and the test circuits and their parts are contained within the cabinet back of the panel. This indicates the analyzer generally.

Mounted on the panel 5 (Fig. 2) are two meters 6 and 7. Each one is used with a chosen group of test circuits. The group chosen for use with meter 6 on the left side of panel 5 will be described first. This meter 6 is used in connection with three sets of test circuits as follows: a first set of circuits for testing the capacity, leakage and series resistance of the condenser of the ignition system; a second set of circuits, containing an electric tachometer, for testing engine speed, and a third set of circuits for testing the dwell of the breaker points in the distributor housing. The panel 5, below meter 6, is marked off as indicated to show various appliances associated with each set of test circuits. For the condenser test there are terminals 8 and 9 of the spring clip type to which the terminals of a condenser may be attached, a rotatable handle 10 for operating a gang switch to be described, and a rotatable handle 11 for operating an adjusting device, such as a variable resistor, to be later described. For the engine speed test, there are sockets 12 and 13 to receive the plug terminals, such as 14 (Fig. 9), of high tension lead wires, such as 15, which are respectively adapted to be connected to any engine spark plug and to the ground. For the point dwell test, there is a receptacle 16 having sockets 17 and 18 to receive the prong terminals, such as 19 and 20 of a plug, at one end of lead wires, such as 21 and 21' (Fig. 8), which at their other ends have spring clip terminals 22. The plug also includes a non-conducting rod 23 for a purpose to be described. There is also a rotatable knob 22' for operating an adjusting device and a handle 23' for operating a switch to set the circuits in either adjusting or testing position.

Figure 9:

Associated with the engine speed and point dwell test circuits are gang switches. One suitable form of switch, adapted for the point dwell test, is shown in Figs. 4, 5, 6 and 7. It includes a frame 24 having a plurality of terminal bolts 25 arranged in opposed pairs, and a slider 26 (Fig. 5) containing a plurality of spring pressed contacts 27, each adapted to connect two opposed terminal bolts 25 by engaging the heads thereof. A spring 28 tends to hold the slider 26 in the one position shown. The slider is moved against this spring to its other position by a rod 25', the outer end of which is engaged by the non-conducting rod 23 on the plug when the prongs 19 and 20 are inserted in the sockets 17 and 18 of receptacle 16—the rod 23 entering a hole 26' in the receptacle. The rod 23 is held in place in the receptacle by a spring pressed ball 27' (Fig. 6) which engages in a groove 28' in rod 23. (Fig. 8). The gang switch for the engine speed test may be of similar construction and operated to move its slider against its spring when the plug 14 on the spark plug lead wire is inserted in the socket 12.

The meter 6 is a direct current voltmeter of the D'Arsonval type. It has three scale bands 29, 30 and 31 (Figs. 2 and 3), which may each have one or more scales and which are respectively graduated appropriately for the condenser, engine speed and point dwell tests. These bands 29, 30 and 31 are respectively arranged with electric signal lamps 32, 33 and 34 (Fig. 3), contained in box-like compartments 35, 36 and 37, respectively. The lamp in each compartment throws its light against one scale band only, that one covering the front of its compartment. These lamps signal when their respective tests are in operation, as will later appear. The meter is heavily damped to avoid fluctuation of its pointer. This may be done by any suitable means which in the present case include a condenser 29' (Fig. 11) bridged across the meter terminals. Included in series in the bridging circuit is a choke coil 30', the purpose of which is to exclude from the meter radio frequency currents, particularly in the condenser resistance test and speed test.

Figure 11:
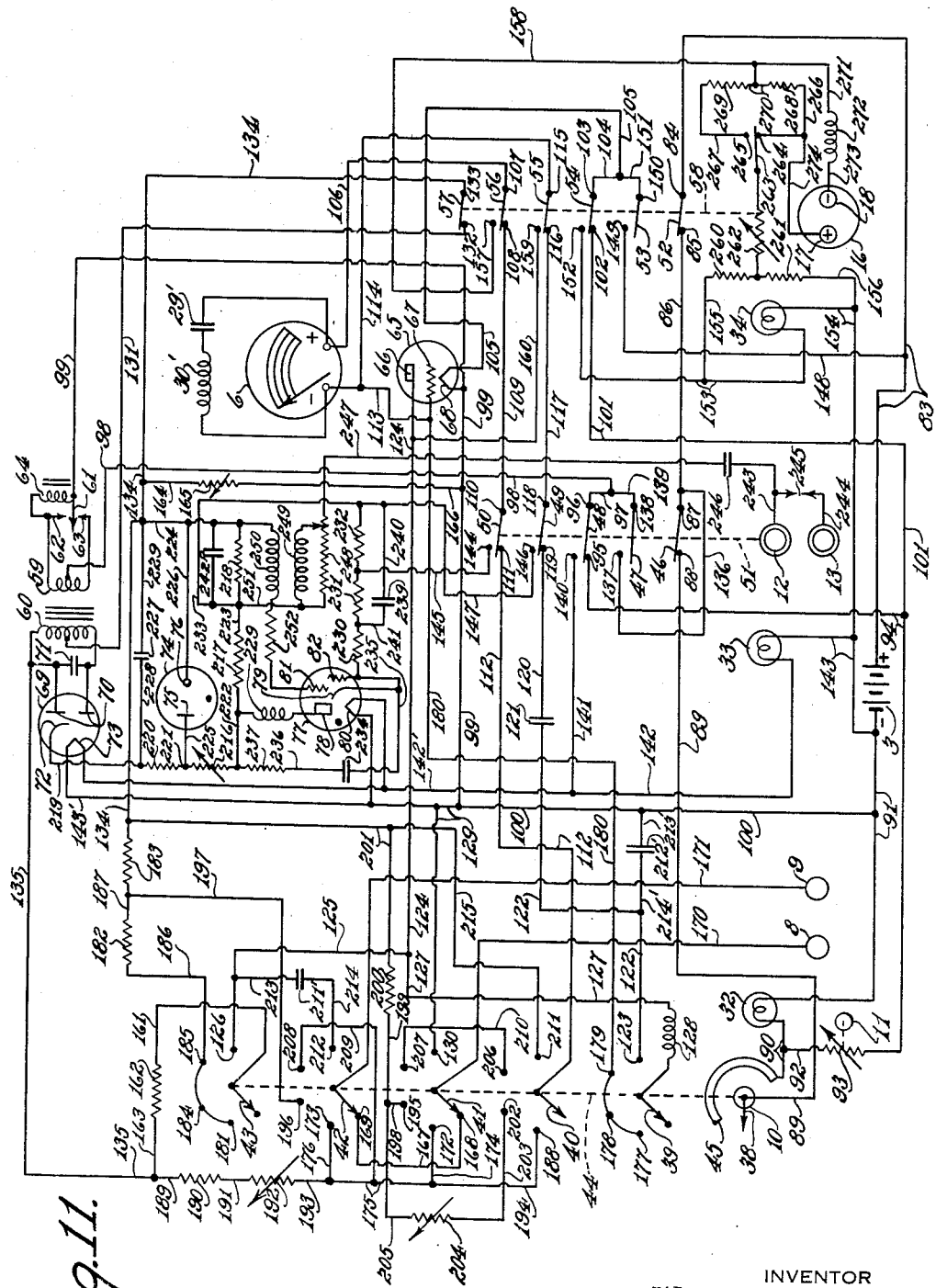
Fig. 11 is a wiring diagram showing three coordinated test circuits for engine speed, point dwell and condenser tests, respectively.

The three sets of test circuits associated with meter 6 are shown completely in diagrammatical form in Fig. 11. Each set of circuits has a gang switch for putting it and its signal lamp into operation and preventing operation of more than one test circuit and signal lamp at one time. The gang switch for the condenser test is represented by a series of rotatable blades 38, 39, 40, 41, 42 and 43, which as indicated by the vertical dotted line 44 are interconnected to be simultaneously moved by the handle 10 of Fig. 2. Each of these blades is movable to five positions which are in each case, except in the case of blade 38, represented by the circular series of five contacts shown, see the instrument panel of Fig. 2. Switch blade 38 is engageable with an arc-shaped contact 45 when knob 10 is in either its second, third, fourth or fifth positions. The five positions may, for example, be designated on the instrument panel 5 as "off," "adjust," "capacity," "leakage" and "resistance." This gang switch is shown in "off" position in Fig. 11. No parts of any condenser test circuit are then operative. The meter 6 is out of circuit and the signal lamp 32 is unlighted. This gang switch is brought into operation by turning knob 10 to its second, third, fourth or fifth position for the various purposes and condenser tests to be later described.

The gang switch, associated with the engine speed test circuits is diagrammatically shown by a series of pivoted blades 46, 47, 48, 49 and 50, which as indicated by the vertical dotted line 51, are interconnected for simultaneous operation. This gang switch is shown in its "off" position. When the plug 14 of test lead 15 is inserted into socket 12, the gang switch will be moved to its other and "on" position. With this second gang switch in "off" position, no parts of the engine speed test circuit are operative, the meter 6 is out of circuit, and the signal lamp 33 is unlighted.

The gang switch, associated with the point dwell test circuits, is diagrammatically represented by a series of pivoted switch blades 52, 53, 54, 55, 56 and 57, which as indicated by the vertical dotted line 58, are interconnected for simultaneous operation. This gang switch is also shown in its "off" position in which no parts of the point dwell test circuits are operative, the meter 6 is disconnected and the signal lamp 34 is unlighted. This gang switch is moved to its other and "on" position by the rod 23 when inserted in the hole 26' at the same time that the prongs 19 and 20 of the test leads 21 and 21' are inserted in the sockets 17 and 18 of receptacle 16.

Also used with either the condenser or the engine speed test circuits is a transformer consisting of primary and secondary windings 59 and 60, a vibrator 61, movable between contacts 62 and 63, connected one to one end and the other to the other end of the primary, and an electromagnet 64 for actuating the vibrator and connected between the contact 62 and the vibrator. This transformer will step up the voltage as applied from battery 3 and transform the direct current into alternating current.

Used either with the condenser test circuits or the point dwell test circuits is a triode 65 having plate 66, grid 67 and heating filament 68 forming the cathode. This device functions as a rectifier and prevents the passage of one half of each alternating current wave. The triode also functions as an amplifier to sustain oscillations in a tuned circuit in connection with the condenser resistance test as will later appear. The triode also functions as a polarity sensitive device in connection with the point dwell test to differentiate between a condition where the points are closed and a condition where the points are open.

Used only with the speed test are a full wave rectifier 69, the two plates 70 of which are connected one to each end of the secondary 60 of the transformer. A condenser 71 is connected across these plates and across the ends of secondary 60. The cathode 72 is heated by the filament 73. The purpose of this device is to rectify the alternating current wave impressed on it by the secondary 60. Also used with the speed test is a gas-filled, voltage-regulator tube 74 having terminals 75 and 76. The function of this tube is to maintain a constant voltage across its terminals. A third tube used with the speed test is a gaseous tetrode 77 having plate 78, cathode 79, heating filament 80, control grid 81, and shielding grid 82—the latter being electrically connected to the cathode.

These various sets of test circuits are interlocked so that no more than one can be used at a time and so that the various elements described—such as meter, transformer, triode, rectifier, voltage regulator and tetrode are brought into circuit when needed. The various signal lamp circuits are interlocked so that not more than one signal lamp can be lighted at a time and so that the lighting of each lamp signals that the test circuit with which it is associated has been rendered operative. Since the sets of test circuits are interrelated, the invention will best be understood by tracing these circuits with reference to Fig. 11 to show how each circuit is brought into play and how those of the above named elements necessary to each test are included in the circuit, and how the interlocking of both test circuits and signal lamp circuit is effected.

Assume that the condenser to be tested is connected to the terminals 8 and 9. Assume also that the gang switches for the engine speed and point dwell tests are in their normal "off" positions as illustrated and that the handle 10 is turned to either its second, third, fourth or fifth position. The engagement of switch 38 with contact 45 will close a circuit to signal lamp 32, a circuit to the primary 59 of the transformer, and a circuit to the heater 68 of triode 65. This lamp circuit may be traced as follows—from the positive terminal of battery 3 by wire 83, terminal 84, switch 52, contact 85, wire 86, terminal 87, switch 46, contact 88, wire 89, switch 38, contact 45, wire 90, lamp 32, and wire 91 to the negative terminal of battery 3. The circuit to the primary 59 is the same as for lamp 32 as far as wire 90 and then extends through a wire 92, a rheostat 93, wire 94, contact 95, switch 48, terminal 96, wires 97 and 98 to the mid point of the primary 59 of the transformer and thence through the vibrator and wires 99 and 100 and part of wire 91 to the negative terminal of the battery. The triode is activated by connecting its heating filament 68 to the battery 3. The circuit from the battery is traced as before through closed switches 52, 46 and 38, wires 90 and 92, rheostat 93, and wire 94 as far as a wire 101 and thence by the latter to contact 102, switch 54, terminal 103, wires 104 and 105 to one terminal of filament 68 and from the other terminal of the latter to return wires 99, 100 and 91 to the negative terminal of battery 3. It will be seen that the opening of switch 38 by the hand-operated means 10 will cause signal lamp 32 to be extinguished, the primary 59 of the transformer to be deenergized and the triode 65 to be deactivated. It will also be seen that either switch 46 or 52 will be opened if the gang switches for the engine speed or for the point dwell tests, respectively, are actuated by the insertion of plug 14 into socket 12 or of prongs 19 and 20 into sockets 17 and 18, respectively, of receptacle 16.

Both the engine speed and point dwell tests thus dominate the condenser test. Hence, if one plugs in a test lead or leads to start either the engine speed test or the point dwell test without first opening the switch 38, the condenser test circuit and its signal lamp will automatically be rendered inoperative. And the dominating test circuit, which caused the condenser test circuit to become inoperative, will be rendered operative. The meter 6 is connected to the condenser test circuit as follows: from the positive terminal of the meter by a wire 106, terminal 107, switch 56, contact 108, wire 109, terminal 110, switch 50, contact 111, wire 112 to switch 90 of the condenser test gang switch. The negative terminal of the meter is connected by a wire 113 to the grid 67 of triode 65. The negative terminal of the meter is also connected by a wire 114, leading from wire 113 and extending to terminal 115 of switch 55 and the contact 116 of this switch is connected by wire 117 to terminal 118 of switch 49. This switch 49 engages a contact 119 which is connected by a wire 120 to a condenser 121 and the latter is connected by a wire 122 to the fifth contact 123 of switch 39. The plate 66 of the triode 65 is connected to the condenser test circuit by wires 124 and 125, which connect with the fifth or "resistance test" contact 126 of switch 43. Plate 66 is also connected by wires 124 and 127 and an inductance 128 to the switch 39. The cathode 68 is connected to the condenser test circuit by wire 99 and a wire 129 leading to the fifth or "resistance test" contact 130 of switch 41. It will be clear that if either the gang switch for the engine speed test or that for the point dwell test is actuated while the gang switch for the condenser test is in "on" position, the opening of switches 49 and 50 or 55 and 56 will open the circuit between the meter and the condenser test circuit. The secondary 60 of the transformer is connected to the condenser test circuits as follows—from the mid point of the secondary by a wire 131, contact 132, switch 57, terminal 133, and a wire 134 which leads to the condenser test circuit. One end terminal of the secondary 60 is connected by a wire 135 to the condenser test circuit. The arrangement is such that the secondary 50 is automatically disconnected from the condenser test circuits by the opening of switch 57 if the gang switch for the point dwell test circuits is moved to "on" position while the gang switch for the condenser test circuits is still in "on" position.

Considering next the engine speed test circuits and assuming that its gang switch has been moved to its upper and "on" position by the insertion of plug 14 in socket 12 and that the other two gang switches are in their "off" positions shown, the signal lamp 33 will be lighted; the primary 59 of the transformer will be energized; the rectifier 69, voltage regulator 74 and tetrode 77 will be put into action; and the meter 6 will be connected into the engine speed test circuit. The circuit for the signal lamp 33 may be traced as follows—from the positive terminal of the battery 3 by wire 83, terminal 84, switch 52, contact 85, wires 86 and 136, contact 137, switch 47, terminal 138, wires 139 and 97, terminal 96, switch 48, contact 140, and wires 141 and 142 to one terminal of lamp 33 and from the other terminal of the latter by a wire 143 and a part of wire 91 to the negative terminal of battery 3. The respective filaments 73 and 80 of rectifier 70 and tetrode 77 are connected in parallel with lamp 33 so as to be energized coincidentally therewith. This is accomplished by a wire 142' which connects one terminal of both filaments 73 and 80 to wire 142 and by a wire 143' which connects the other terminal of both said filaments to the wire 129 and through a portion of the latter to wire 100 and thence by the latter and a part of wire 91 to wire 143. The circuit for the primary 59 of the transformer may be traced as follows—starting from the positive terminal of battery 3 by wire 83, terminal 84, switch 52, contact 85, wires 86 and 136, contact 137, switch 47, terminal 138, and wires 139 and 98 to the mid point of primary 59 and thence through the vibrator and wires 99, 100 and part of wire 91 to the negative terminal of the battery. The positive terminal of meter 6 is connected to the engine speed test circuit as follows—by wire 106, terminal 107, switch 56, contact 108, wire 109, terminal 110, switch 50, contact 144, and a wire 145 to the engine speed test circuit. The negative terminal of the meter is connected to the engine speed test circuit as follows—by wire 113 as far as wire 114, wire 114, terminal 115, switch 55, contact 116, wire 117, terminal 118, switch 49, contact 146, and wire 147 to the engine speed test circuit. It will be seen that if while the gang switch for the engine speed test circuit is in its "on" position, the gang switch for the point dwell test is moved to its "on" position, the engine speed test circuit will be rendered inoperative and the point dwell test will be rendered operative. In particular, the opening of switch 52 will open the circuit to signal lamp 33, the circuit to the heating filaments of tubes 69 and 77 and the circuit to primary 59 of the transformer, and the meter 6 will be cut out of the engine speed test circuit by the disengagement of switches 55 and 56 from contacts 116 and 108, respectively. The point dwell test circuit thus dominates the engine speed test circuit. Now, assume that the gang switch for the point dwell test is in its "off" position while the gang switch for the engine speed test remains in "on" position. If the handle 10 is turned to any of its four "on" positions, the condenser test circuit cannot be rendered operative. The battery 3 is disconnected from signal lamp 32 and from filament 68 of triode 65 and the primary 59 of the transformer is disconnected from the condenser test circuit because switch 46 is open. The meter 6 is disconnected from the condenser test circuit because the switches 49 and 50 have been disengaged from their respective contacts 119 and 111.

Considering next the point dwell test circuit and assuming that its gang switch has been moved to its upper and "on" position by the insertion of prongs 19 and 20 in the sockets 17 and 18 of receptacle 16 and that the gang switches for the engine speed test and the condenser test are in their lower and "off" positions, the signal lamp 34 will be lighted, the triode 65 will be activated by the heating of filament 68, the meter 6 will be connected to the point dwell test circuit and the latter will be rendered operative. The circuit for signal lamp 34 may be traced as follows—from the positive terminal of battery 3 by wire 83 as far as wire 148, through the latter, contact 149, switch 53, terminal 150, wires 151 and 104, terminal 103, switch 54, contact 152, and a wire 153 to one terminal of lamp 34 and from the other terminal of the lamp by wire 154 to wire 143, by part of wire 143 to wire 91, and by part of wire 91 to the negative terminal of the battery. The circuit for the filament 68 may be traced in the same way as for signal lamp 34 from the positive terminal of the battery up to and through wire 151, and thence by wire 105 to one terminal of filament 68, and from the other terminal of this filament by way of wires 99 and 100 to wire 91, and by part of wire 91 to the negative terminal of the battery 3. The positive terminal of the battery is connected to the point dwell circuit as follows—by wire 83 as far as wire 148, through the latter, contact 149, switch 53, terminal 150, wires 151 and 104, terminal 103, switch 54, contact 152, wire 153 as far as wire 155, and through the latter to the point dwell test circuit. The negative terminal of the battery is connetced to the point dwell test circuit by a wire 156 and part of wires 154, 143 and 91. The positive terminal of meter 6 is connected to the point dwell test circuit as follows—wire 106, contact 107, switch 56, a contact 157, which is then engaged by switch 56, and a wire 158. The negative terminal of the meter is connected to the point dwell test circuit by connecting it to the plate 66 of triode 65, as follows—by wire 113 as far as wire 114, wire 114, terminal 115, switch 55, contact 159, which switch 55 then engages, and a wire 160 to plate 66. It will be clear that neither the engine speed test circuits nor the condenser test circuits can be rendered operative, while the gang switch for the point dwell test is in its upper and "on" position, because the battery 3 is cut off from both the engine speed and condenser test circuits by the then open switch 52; the cathode 68 of triode 65 is cut off from the engine speed test and condenser test circuits by the disengagement of switch 54 from contact 102; and the meter 6 is cut off from both the last-named circuits by the disengagement of switches 55 and 56 from their respective contacts 116 and 108. The point dwell test circuit thus dominates the other two test circuits.

It should be noted that when the point dwell test circuit is operative, the switch 57 is opened, which cuts off the secondary 60 of the transformer from the condenser test circuit. But for this arrangement, it would be possible to create a shunt circuit across the plate 66 and cathode 68 of triode 65 in case the handle 10 of the condenser test gang switch were left in "resistance" position while the point dwell test is operative. Such shunt circuit would adversely affect the meter readings during the point dwell test. This shunt circuit may be traced as follows—from plate 66 by wires 124 and 125 to the fifth contact 126 of switch 43, through switch 43, a wire 161, a resistor 162 and wires 163 and 135 to one end of secondary 60, through the secondary to its mid point and thence by wire 131, contact 132, switch 57, terminal 133, wire 134 as far as a wire 164, by wire 164 to and through a variable resistor 165, and a wire 166 to wire 99 and through the latter to the cathode 68. The shunt circuit described will pass direct current. In the point dwell test, the tube 65 is used as a unidirectional current device. The shunt would therefore prevent the tube from functioning as desired and would cause the meter to read incorrectly during the point dwell test. The switch 57 opens to prevent the difficulty described and thereby enable the meter to operate correctly on the point dwell test.

The various test circuits herein shown in connection with meter 6 are given as illustrative examples of circuits suitable for the purposes of this invention. Each will be described as briefly as possible to complete the disclosure.

Considering first the condenser test. There are several test circuits, one for each position of knob 10, that is one each for testing the capacity, leakage and series resistance of the condenser and one for adjusting the voltage supplied to the circuits to a predetermined value suitable for making all of these tests. In the "off" position of handle 10, the condenser under test, which is connected across terminals 8 and 9, is short circuited. This short circuit is effected by a wire 167 which interconnects the first contacts 168 and 169 of switches 41 and 42, respectively—these contacts being then engaged by their respective switches 41 and 42, which in turn are connected by wires 170 and 171 to terminals 8 and 9, respectively, and thus to the condenser under test. After the various condenser tests have been made, the knob 10 is turned back to its initial and "off" position and the aforesaid short circuit will cause the condenser to be completely discharged before it is removed from the testing apparatus.

Figure 12:
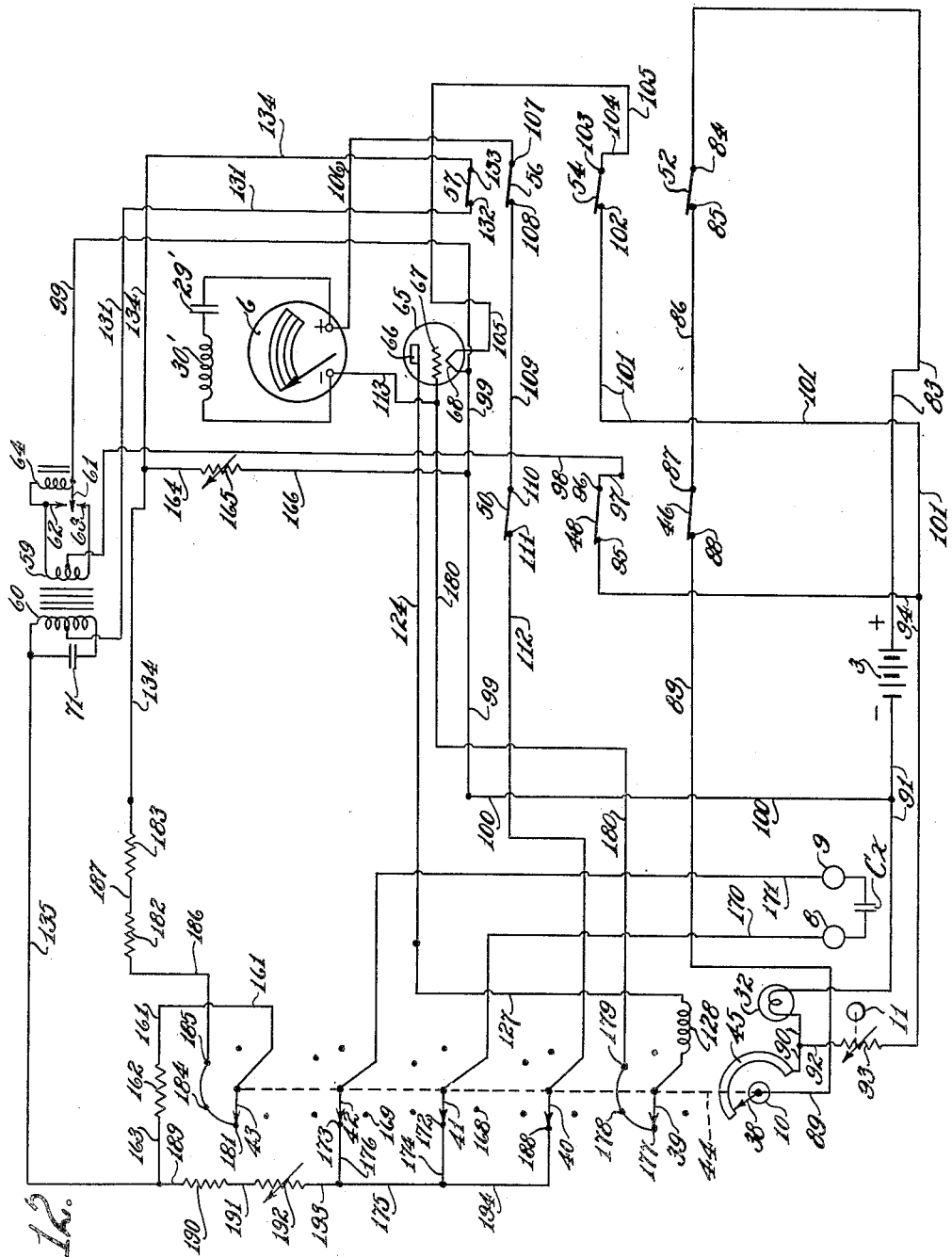
Figs. 12, 13, 14 and 15 are wiring diagrams showing only such portions of the circuits of Fig. 11 as are respectively energized during the adjustment of the condenser test apparatus, and during the capacity, leakage and resistance tests.

When knob 10 is moved to adjust position, the circuits shown in Fig. 12 are rendered active. The engagement of switch blade 38 with segment 45 will cause the signal lamp 32 to be lighted, the tube 65 activated, and the transformer energized, as heretofore described. The contacts 172 and 173 of switches 41 and 42 are interconnected by wires 174, 175, and 176 and, since switches 41 and 42 are connected by wires 170 and 171, and terminals 8 and 9 respectively, to the condenser, which is to be tested and which is marked $Cx$, the condenser will be short circuited. The tube 65 is converted to a diode by interconnecting the plate 66 and grid 67, as follows—through wires 124 and 127, inductance 128, switch 39, the interconnected contacts 177, 178 and 179 of switch 39 and a wire 180 which connects contact 179 to the grid 67. The switch 43 will engage contact 181 and close a circuit from the transformer secondary 60 through a voltage divider, comprising resistors 162, 182 and 183, which may for example have the respective resistances of 15,000 ohms, 10,000 ohms and 1500 ohms. This circuit may be traced as follows—from one end terminal of secondary 60 by wires 135 and 163, resistor 162, wire 161, switch 43, contact 181 and the contacts 184 and 185, which are interconnected therewith, wire 186, resistor 182, wire 187, resistor 183, wire 134, terminal 133, switch 57, contact 132, wire 131 to the mid point of secondary 60. The switch 40 will engage its first contact 188 and connect the meter 6 and tube 65 in circuit with the secondary 60, which circuit may be traced as follows—starting from one end of secondary 60, by wires 135 and 189, a resistor 190, of say 100,000 ohms resistance, wire 191, variable resistor 192, of say 50,000 ohms resistance, wires 193, 175 and 194, contact 188, switch 40, wire 112, contact 111, switch 50, terminal 110, wire 109, contact 108, switch 56, terminal 107, wire 106, meter 6, wire 113 to the interconnected grid 67 and plate 66, through the tube to cathode 68, wire 99 as far as wire 166, thence by wire 166, a variable resistor 165, which may for example be of 500 ohms resistance, a wire 164 as far as wire 134, to the right by wire 134, terminal 133, switch 57, contact 132, and wire 131 to the mid point of the secondary 60. The tube 65 is used to rectify the alternating current for the direct current meter 6. The resistor 192 is for calibrating purposes and is used to adjust the pointer of the meter to full scale position when the predetermined voltage is applied to a circuit. The predetermined value of voltage to be supplied is controlled by turning knob 11 which varies the resistance value of resistor 93. Since this resistor is in series with the circuits supplying the heaters 68 of tube 65 and also the primary 59 of the transformer, it will control this voltage supplied. The reading of meter 6, when the gang switch controlled by knob 10 is in the "adjust" position, is an indication of the value of the supplied voltage and the resistor 93 should be varied by turning knob 11 until the reading of meter 6 is a predetermined value, for example, full-scale position.

Figure 13:
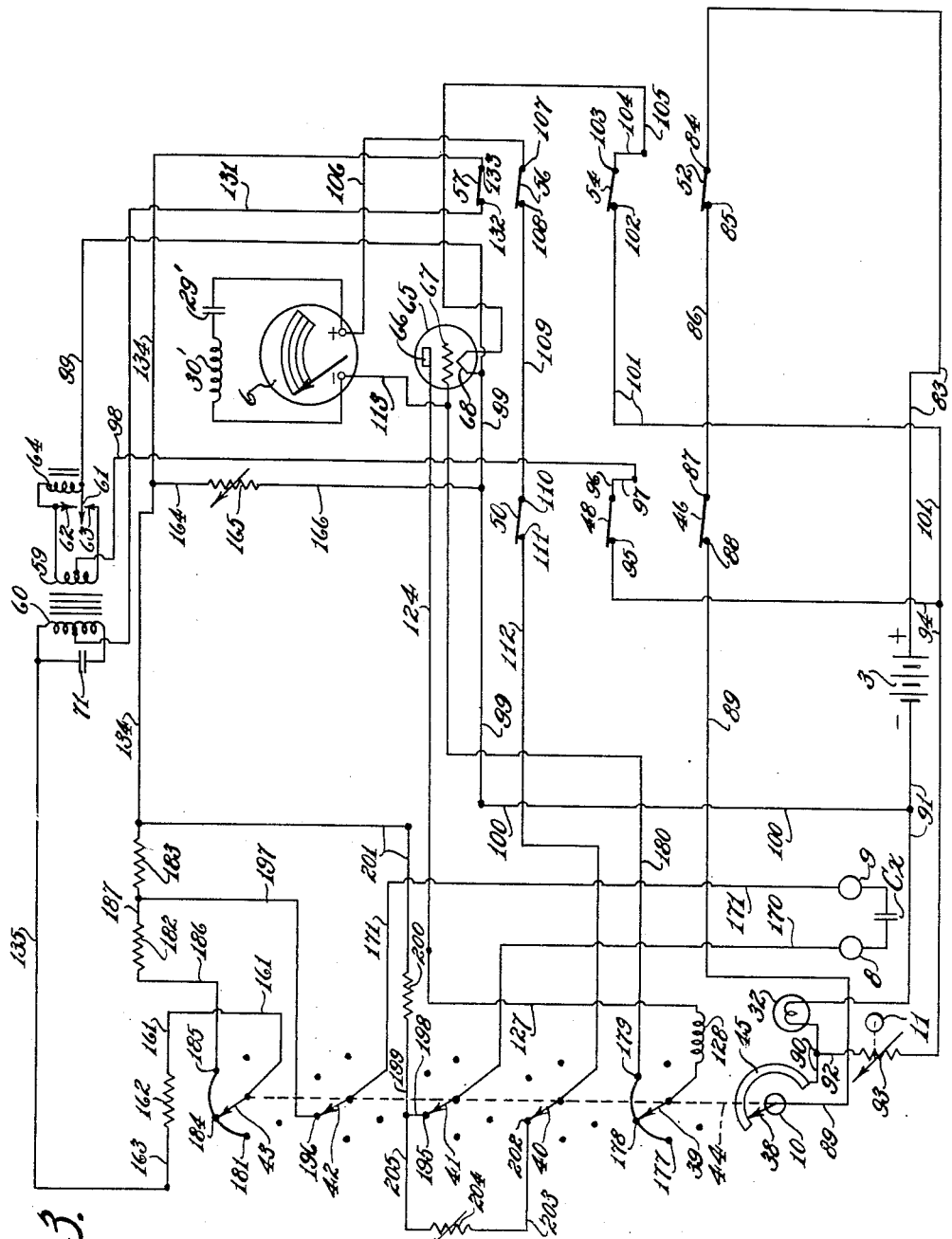

Having made this adjustment, the knob 10 is turned one step to the "capacity" test position. The circuits then active are shown in Fig. 13. The signal lamp 32 remains lighted, the tube 65 remains activated and the primary 59 remains energized by the same circuits as before. The switch 43 engages with contact 184 and maintains closed the same circuit from the secondary 60 through the voltage divider. The switches 41 and 42 engage their respective contacts 195 and 196 and connect the condenser $Cx$ to be tested across the resistor 183 of the voltage divider—the circuit being traced as follows—from one terminal of resistor 183 by wire 197, contact 196, switch 42, wire 171, terminal 9, condenser $Cx$, terminal 8, wire 170, switch 41, contact 195, wires 198 and 199, a resistor 200, which may for example be of 1000 ohms resistance, and wire 201 to the other terminal of resistor 183. The switch 40 engages contact 202 and connects the meter 6 across the terminals of resistor 200 by a circuit which may be traced as follows—starting from one terminal of resistor 200 by wire 199, wire 205, a variable resistor 204, which is used to calibrate for the capacity test and which may for example be of 2000 ohms resistance, wire 203, contact 202, switch 40, wire 112, contact 111, switch 50, terminal 110, wire 109, contact 108, switch 56, terminal 107, wire 106, meter 6, thence by wire 113 to the grid 67 and by wire 113 and 180, contact 179, contact 178, switch 39, inductance 128, wires 127 and 124, to the plate 66, through the tube to the cathode 68, by wire 99 as far as wire 166, wire 166, resistor 165, wire 164, to the left by wires 134 and 201 to the other terminal of resistor 200. The alternating current taken from across the terminals of the resistor 183 of the voltage divider is applied to the condenser $Cx$ to be tested through the relatively low resistance 200, which is in series with it, and the meter is connected to measure the voltage drop across this resistor 200, the current being rectified by tube 65. The current flow will be a function of the size or capacity of the condenser $Cx$ and the voltage drop across resistor 200 is proportional to the current flow through it and thus the meter indications will reflect the capacity of the condenser $Cx$.

Figure 14:
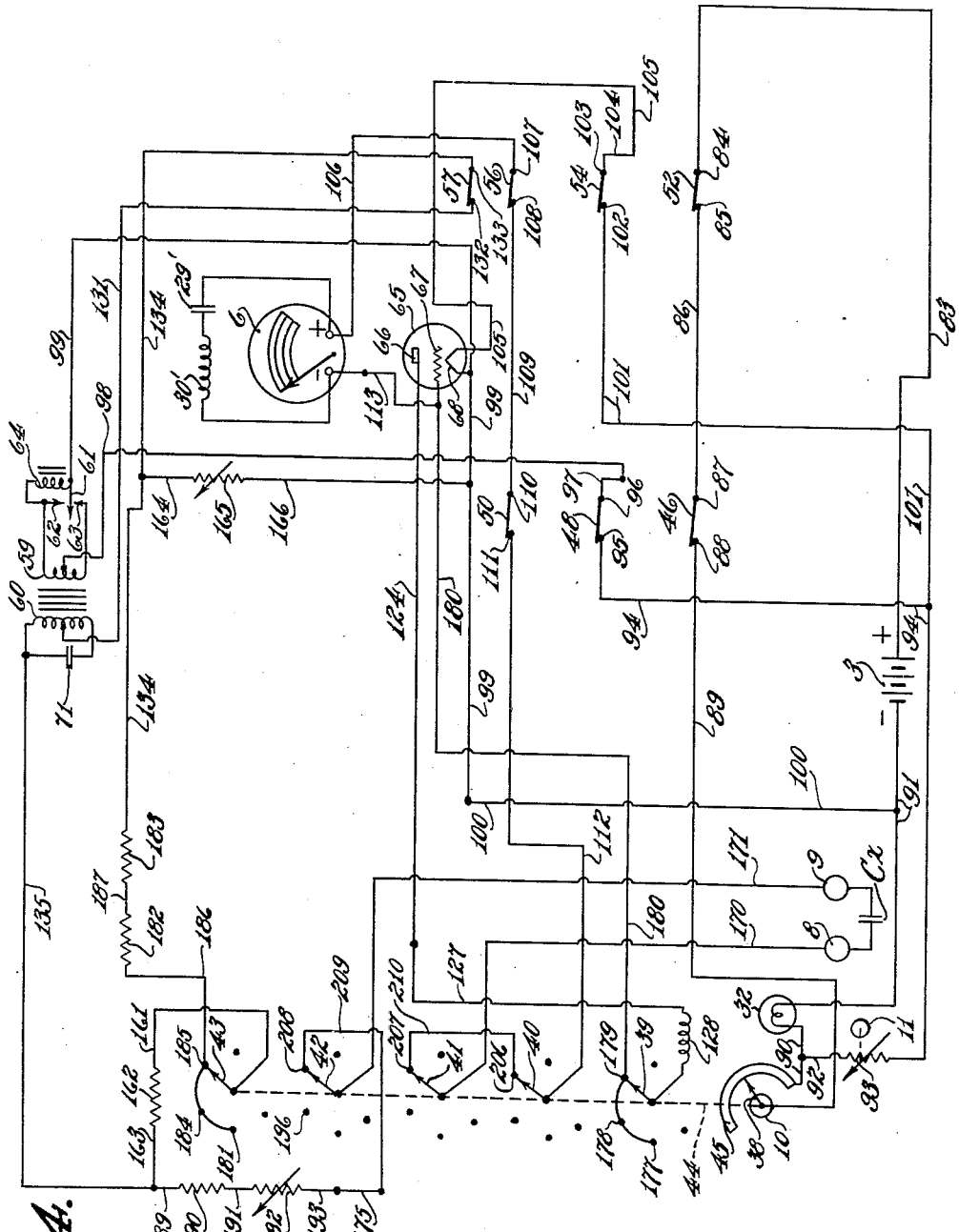

The knob 10 when turned to its next position for the leakage test causes the circuits shown in Fig. 14 to be rendered active. The switch 38, being still engaged with contact 45, will cause signal lamp 32 to remain active, the tube 65 to remain activated and the primary 59 of the transformer to remain energized by the same circuits as heretofore described. The switch 43 engages contact 185 and maintains closed the circuit from the secondary 60 through the voltage divider in the same manner as in the capacity test. The switches 40, 41 and 42 by engaging their respective fourth contacts 206, 207 and 208 serve to connect the condenser $Cx$ to be tested, the meter 6 and the calibrating resistors 190 and 192 in a series circuit across the terminals of the voltage divider. This series circuit may be traced as follows—from one terminal of the voltage divider by wire 189, resistor 190, wire 191, variable resistor 192, wires 193 and 175, as far as a wire 209, wire 209, contact 208, switch 42, wire 171, terminal 9, condenser Cx, terminal 8, wire 170, switch 41, contact 207, wire 210, contact 206, switch 40, wire 112, contact 111, switch 50, terminal 110, wire 109, contact 108, switch 56, terminal 107, wire 106, meter 6, wires 113 and 189, contact 179, switch 39, inductance 128, wires 127 and 124, plate 66, through the tube 65 to the cathode 68, by wire 99 as far as wire 166, wire 166, resistor 165, wire 164 to wire 134, and to the left by wire 134 to the other terminal of the voltage divider. Thus, rectified alternating current is applied to the condenser Cx to be tested and the latter becomes charged. Charging occurs gradually because of the relatively high series resistance. The meter 6 will measure current flow. The needle will rise until the condenser Cx becomes fully charged and then will drop back to zero if there is no leakage resistance in the condenser. The only current flowing after the condenser Cx is fully charged will be leakage current and this will be indicated on the scale of the meter 6 by departure of the needle from zero position.

Figure 15:
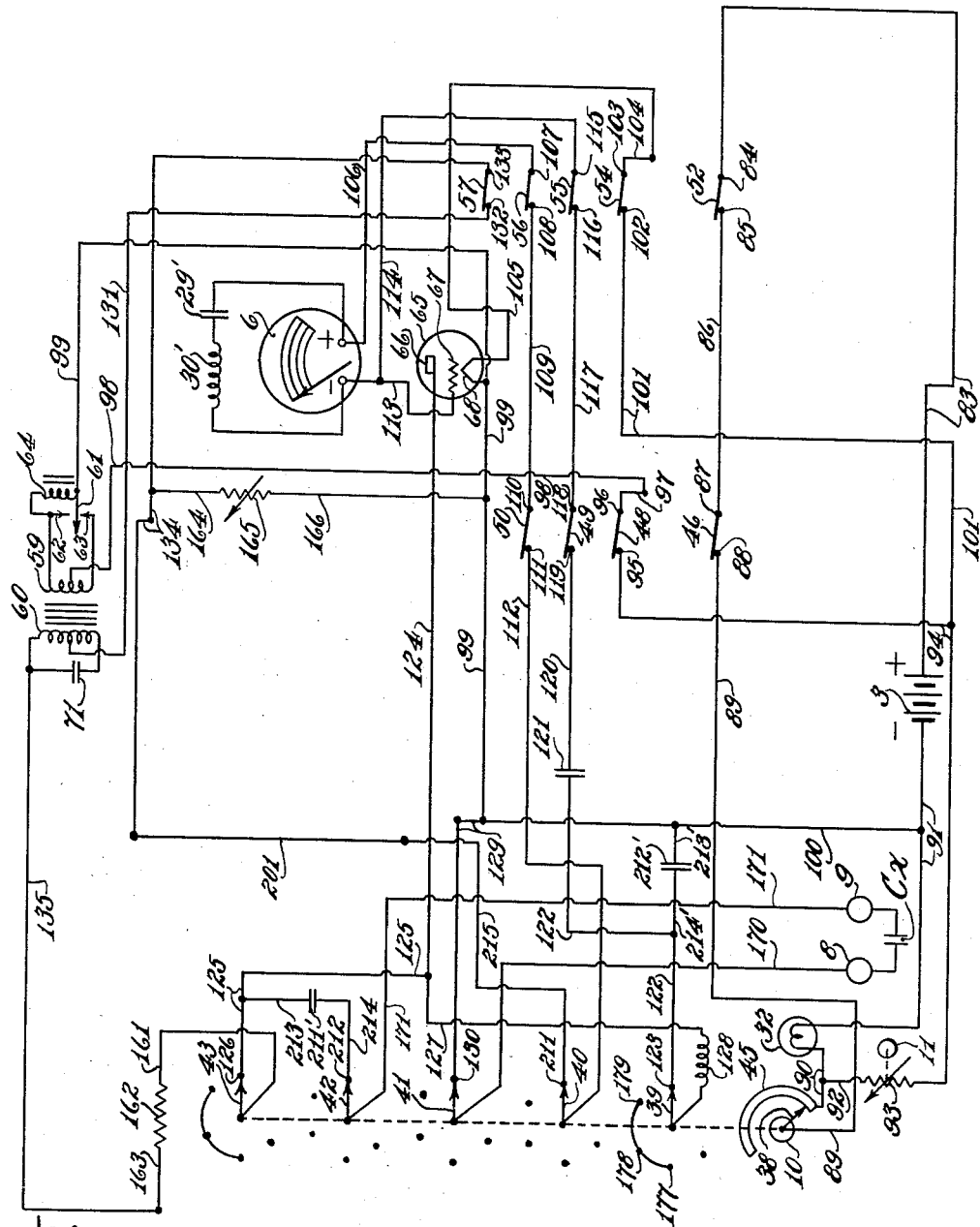

The series resistance test is effected when knob 10 is turned to its fifth and last position. The circuits which are then rendered active are shown in Fig. 15. The switch 38, being still engaged with contact 45, the signal lamp 32 remains lighted, the tube 65 remains activated and the primary 59 of the transformer remains energized by the same circuits as heretofore described. The engagement of switches 39, 40, 41, 42 and 43 with their respective contacts 123, 211, 130, 212 and 126 serve to connect the parts so as to form a Colpitts oscillator. The tank circuit of the latter comprises the inductance 128, two condensers 211' and 212' and the condenser Cx to be tested, all connected in series. Thus, one terminal of inductance 128 is connected by wire 127 to a wire 125, and the latter is connected by a wire 213 to one terminal of condenser 211'; the other terminal of the latter is connected by a wire 214, contact 212, switch 42 and wire 171, to terminal 9 and thus to one side of the condenser Cx; the other side of the condenser Cx is connected to terminal 8 and thence by wire 170, switch 41, contact 139, wire 129, wire 100 as far as a wire 213', and by the latter to one terminal of the condenser 212'; the other terminal of condenser 212' is connected by a wire 214' to wire 122, through the latter, contact 123, and switch 39 to the other terminal of the inductance 128. One end terminal of the secondary 60 of the transformer is connected by wires 135, 163, resistor 162, wire 161, switch 43 and contact 126 to wire 125 and thus to one side of the tank circuit of the oscillator. The mid point of secondary 60 is connected by wire 131, contact 132, switch 57, terminal 133, wire 134 as far as wire 164, wire 164, variable resistor 165, wire 166, to the left by wire 99 as far as wire 129, and wire 129 to a point in the tank circuit between the condensers Cx and 212'. The right hand part of wire 99 connects with the cathode 68. The tube 65 becomes a triode since the connection between the plate 66 and grid 67 was broken when switch 39 became disengaged from contact 179. The plate 66 is connected by wire 124, wire 125, contact 126, switch 43, wire 161, resistor 162 and wires 163 and 135 to one end terminal of the secondary 60. The meter 6 is connected in the grid circuit thus—a wire 113 connects the grid to one terminal of the meter and the other terminal of the latter is connected to the mid point of the secondary as follows—by wire 106, terminal 107, switch 56, contact 108, wire 109, terminal 110, switch 50, contact 111, wire 112, switch 40, contact 211, wires 215, 201 and 134, terminal 133, switch 57, contact 132, and wire 131. The grid 67 of tube 65 is connected to the tank circuit as follows, by wires 113 and 114, terminal 115, switch 55, contact 116, wire 117, terminal 118, switch 49, contact 119, wire 120, condenser 121, to wire 122, contact 123, and switch 39 which connects with one terminal of inductance 128. Connection is also made from wire 122 through wire 214' to one terminal of condenser 212'. The condenser Cx to be tested is large as compared to the condensers 211' and 212'. The impedance of the condenser to be tested is therefore small as compared to condensers 211' and 212' and its insertion in the tank circuit has no appreciable effect provided it has little or no series resistance. Because of the fact that there is a relatively large current flowing in the tank circuit the latter is particularly sensitive to series impedance and the introduction of series resistance in the tank circuit has a decided effect on the amplitude of the oscillations therein. This effect is reflected in the flow of grid current which is measured by and indicated on the meter 6. The resistance value of the variable resistor 165 affects the bias applied to the triode 65 and hence affects the amplitude of oscillations in the tank circuit and, as a result, the grid current measured by meter 6 is varied. This resistor 165 is used to calibrate the resistance test circuit.

Figure 16:
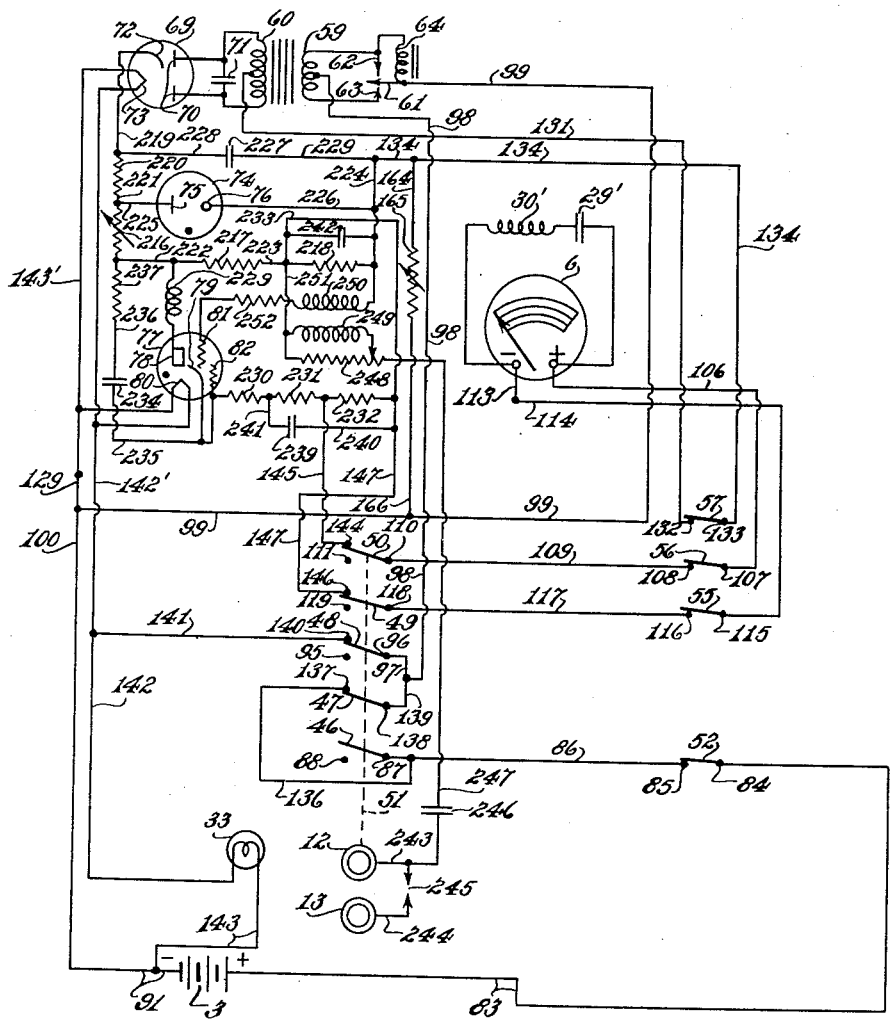
Fig. 16 is a wiring diagram showing only such portions of Fig. 11 as are energized during the engine speed test.

The circuit for the engine speed test is shown separately from the others in Fig. 16. The insertion of the plug 14 in socket 12 will move the gang switch elements to the positions shown. The signal lamp 33 will be lighted, the primary 59 of the transformer will be energized, and the tubes 69, 74 and 77 will be activated, all as heretofore described. For the speed test, the tetrode 77 is made to fire by, and simultaneously with, a spark plug on the engine and thus in proportion to engine speed, and the meter is made to give indications which are proportional to the frequency of firing of the tetrode. The full wave rectifier 69 is connected in series with a voltage divider, comprising a variable resistor 216, of say 10,000 ohms, and resistor 217 and 218 of say 40,000 and 1500 ohms respectively. This circuit may be traced as follows—starting at the cathode 72 by wire 219, a resistor 220 of say 6500 ohms, wire 221, resistor 216, a wire 222, resistor 217, wire 223, resistor 218, wire 224, to the right by wire 134, terminal 133, switch 57, contact 132, wire 131 to the mid point of secondary 60 and through the latter to the plates 70 of the rectifier tube 69. The tube 74 is connected by wires 225 and 226 to the wires 221 and 224, respectively, and tends to maintain constant voltage across these wires. The resistor 220 is a dropping resistor to permit the tube 74 to regulate the voltage by varying the voltage drop across this resistor. A condenser 227, of say 12 mf. capacity, is connected by wires 228 and 229, respectively, across wires 219 and 224, and tends to smooth out the half-cycle waves of the rectified current and yield approximate direct current in the circuit which includes the voltage divider 216, 217 and 218. The voltage drop across the large resistor 217 of this voltage divider is applied to the plate-cathode circuit of the tetrode 77, as follows—starting from one terminal of resistor 217, by wire 222 to and through an inductance 229 to the plate 78, and from the cathode 79, through three resistors 230, 231, and 232, which have respective resistances of 20,000, 3,000 10,000 ohms, respectively, to a wire 233 which connects with wire 223 and the other terminal of resistor 217. The resistors 230, 231 and 232 serve to limit the current flow in the plate-cathode circuit of the tube 77 when the latter fires. Bridged across the plate-cathode circuit of tube 77 is a condenser 234, of say .2 mf. capacity, which condenser is connected by a wire 235 to the cathode 79 and by a wire 236 and a 100 ohm resistor 237 to wire 222 and through inductance 229 to plate 78. A condenser 239, of say 200 mf. capacity, is connected by a wire 240 to wire 147 and by a wire 241 to a point between resistors 230 and 231 and is thus bridged across the resistors 231 and 232. A condenser 242, of say .01 mf. capacity, is bridged across the wires 224 and 233 and thus across resistor 218 of the voltage divider. These condensers 239 and 242 tend to absorb transient surges in their circuits. The terminals 12 and 13 are adapted to be connected by the test leads to the spark plug and the frame of the engine, respectively. These terminals 12 and 13 are connected by wires 243 and 244 to a safety spark gap 245. Each time the spark plug fires, an impulse is produced in the ignition circuit, and travels through the wire 243, capacitor 246, to and through a wire 247, where it divides and passes in part through a variable resistor 248, and in part through a coil 249. The coil 249, and a companion coil 250, provide an inductive coupling with the trigger circuit of the tetrode 77. The other terminal of resistor 248 and coil 249 are interconnected by a wire 251 and connected thereby to wire 223. It will be understood that this wire 251 will be capacitor-coupled in any suitable way, as through the shielding, to the ground to complete the spark impulse circuit. The trigger circuit of the tetrode may be traced as follows—from cathode 79 through resistor 230, wire 241, condenser 239, wire 240, up wire 147, wire 233, condenser 242, wire 224, secondary coil 250, and a resistor 252 to grid 81. The tube 77 is prevented from firing by grid bias produced by the voltage drop across resistor 218. No current will then flow from plate 78 to cathode 79 until the tube fires. But current derived from the voltage divider by the voltage drop across resistor 217, will charge condenser 234—the circuit being from one terminal of resistor 217, wire 222, resistor 237, wire 236, condenser 234, wire 235, resistors 230, 231 and 232, and wires 233 and 223 to the other terminal of resistor 217. The meter 6 is connected across the resistor 232 to measure the charging current for condenser 234. When a spark plug fires, a high frequency impulse is transmitted through the capacitor-coupled circuit including wire 247 and coil 249 and by the inductive coupling 249 and 250 to the trigger circuit of tube 77, whereupon the tube fires. The tube 77 is then rendered conductive and condenser 234 will discharge through the plate-cathode circuit as follows—from one terminal of the condenser by wire 236, resistor 237, wire 222, inductance 229, plate 78, through the tube to cathode 79, and wire 235 to the other terminal of the condenser. As this discharge occurs, the voltage drops rapidly and the tube 77 stops firing as soon as the voltage drops below its minimum conducting voltage. The meter measures the average charging current flowing into the condenser 234. This average current will increase and decrease with the increase and decrease in the frequency of charging the condenser 234. For example, if this condenser is charged 10 times a second, the meter reading will be twice that obtained if the condenser is charged 5 times a second. The frequency of charging corresponds to the frequency of discharging. The meter indications therefore depend on the rate of spark plug firing and thus on engine speed.

In connection with the engine speed test circuit, there is a switch 49 which, when this test is made operative, disengages from a contact 119 and breaks a circuit, through which it would otherwise be possible, if an operator left the condenser test knob 10 in "resistance test" position, to apply a bias to the grid 81 of the tetrode 77 and cause the latter to fire erratically. Referring to Fig. 11, this circuit will be traced as if the contact 119 and the terminal 118 were connected together and to the switch 49 and as if switch 49 is engaged with contact 146, as it is when the speed test is made operative. Commencing at one end of the secondary 60 of the transformer, by wires 135 and 163, resistor 162, wire 161, switch 43, contact 126, wires 125 and 127, inductance 128, switch 39, contact 123, wire 122, condenser 121, wire 120, contact 119 and terminal 118 (which are assumed to be engaged), switch 49, contact 146, wires 147 and 233, resistor 218, up wire 224 to wire 134, to the right by wire 134, contact 133, switch 57, contact 132 and wire 131 to the mid point of the secondary 60. This circuit, if permitted to exist during the engine speed test, would cause alternating current to flow through resistor 218. The voltage developed across this resistor forms a bias applied to the grid of the tetrode 77 and should be direct current, as heretofore described. The alternating current through the resistor 218 would cause the tetrode 77 to fire erratically and prevent the engine speed test from functioning properly. Hence, the switch 49 is arranged to break the circuit by disengaging the contact 119 from terminal 118 to prevent the possible adverse condition in case an operator carelessly leaves the condenser test knob 10 in resistance position.

Figure 17:
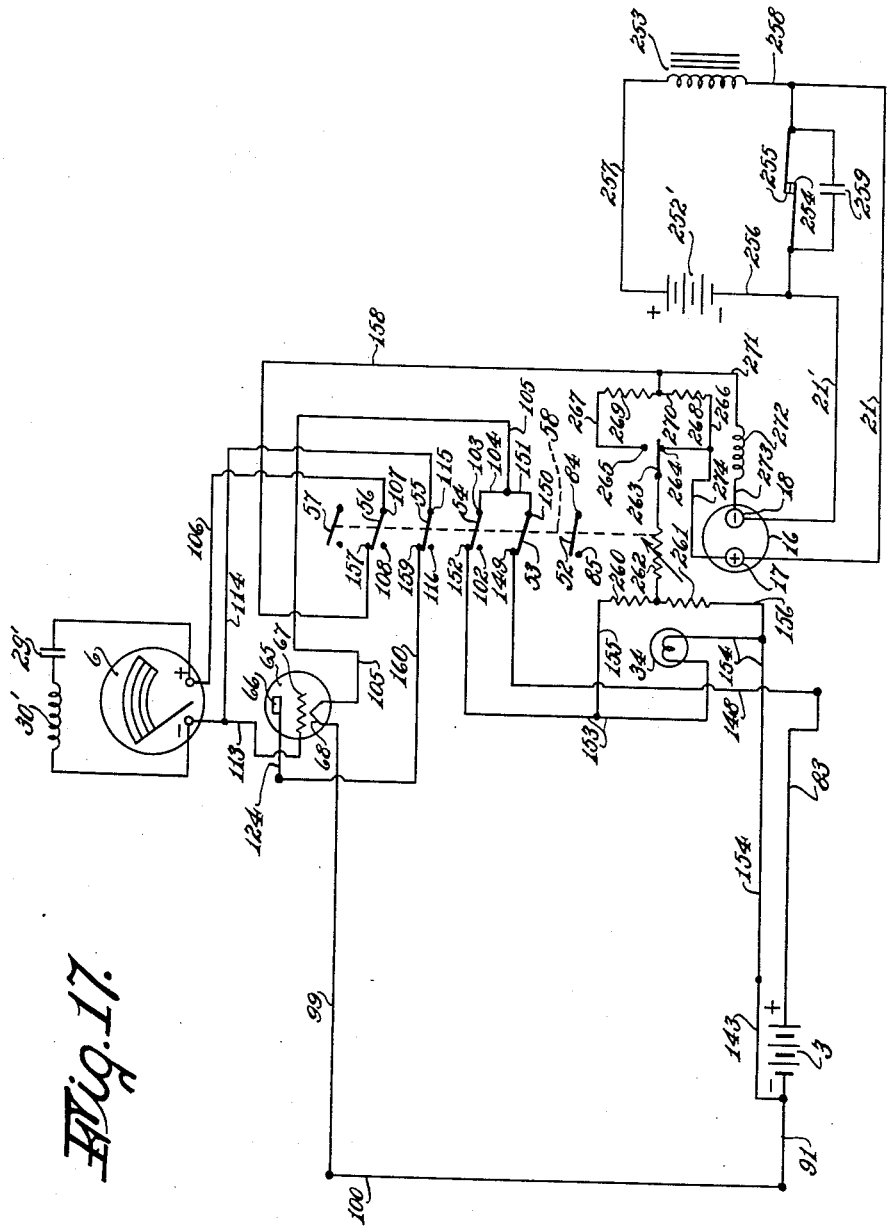
Fig. 17 is a wiring diagram showing only such portions of the circuits of Fig. 11 as are energized during the point dwell test.

Referring next to Fig. 17, the point dwell test will next be described. It will be necessary to consider the "point dwell" circuit of the motor analyzer in connection with the low tension ignition circuit of the engine being tested. Such low tension ignition circuit, as indicated, includes the storage battery 252', primary ignition coil 253, breaker points 254 and 255—all connected in series by wires 256, 257 and 258—and the usual condenser 259 which is bridged across the breaker points 254 and 255. The lead wires 21 and 21' at one end are connected on opposite sides of the breaker points, as to wires 256 and 258, and at their other ends by the described prong terminals 19 and 20, which are thrust in sockets 17 and 18, respectively, of receptacle 16 and thereby cause the gang switch for the point dwell test to be moved to the "on" position shown. The signal lamp 34 will be lighted and the tube 65 will be activated, as before described. The battery 3 is connected across a voltage divider comprising two resistors 260 and 261 which are connected in series. The circuit to the voltage divider may be traced as follows—from the positive terminal of battery 3 by wires 83 and 148, contact 149, switch 53, terminal 150, wires 151 and 104, terminal 103, switch 54, contact 152 and by wire 153 as far as wire 155, and by wire 155 to resistors 260 and 261 and thence by wires 156, part of wire 154, part of wire 143, and part of wire 91 to the negative terminal of the battery. Connected to a point in the voltage divider between the resistors 260 and 261 is one terminal of a variable resistor 262 which is adjustable by means of the knob 22' above described. The other terminal of resistor 262 is connected to a switch 263 which is operable by handle 23' above described. This switch 263 can engage either of two contacts 264 and 265. These contacts 264 and 265 are respectively connected by wires 266 and 267 to resistors 268 and 269 which are connected in series. The adjacent terminals of these resistors are connected together and to wire 158 by a wire 270. Wire 158 is connected by a wire 271, inductance 272 and wire 273 to socket 18. Wire 266 is connected by a wire 274 to socket 17.

The meter 6 has its positive terminal connected to wire 270, and thus to both resistors 268 and 269 and to one side of the breakers 254 and 255 in the ignition circuit of the engine being tested, by a circuit which may be traced as follows—wire 106, terminal 107, switch 56, contact 157, and wire 158 to wire 270. The negative terminal of the meter is connected to the plate 66 of tube 65 by a circuit which may be traced as follows—by wire 113 to wire 114, wire 114, terminal 115, switch 55, contact 159, wire 160, and part of wire 124 to the plate 66. The grid 67 is connected by wire 113 to wire 114 and thus to the plate 66. The tube 65 thus becomes a diode and its action in the point dwell test is as a valve to permit flow of current through the meter 6 in one, and the proper direction only. Preliminary to making the point dwell test, the switch 263 is moved to engage contact 264 and the resistor 262 is adjusted by turning knob 22' until the needle of the meter reads full scale. The meter 6, resistors 268, 262 and 261 and tube 65 are then included in a series circuit, which may be traced as follows—from the point between resistors 260 and 261, through variable resistor 262, switch 263, contact 264, wire 266, resistor 268, wires 270 and 158, contact 157, switch 56, terminal 107, wire 106, meter 6, wire 113 as far as wire 114, wire 114, terminal 115, switch 55, contact 159, wire 160 to plate 66, through tube 65 to cathode 68, thence by wires 99 and 100, to the right by wire 91, to wire 143, wire 143 as far as wire 154, wire 154 as far as wire 156, and wire 156 to resistor 261. After meter 6 has been adjusted for full scale reading, switch 263 is moved to engage contact 265. This cuts out of circuit resistor 268 and throws into circuit the resistor 269 which is of proper value to compensate for the effect of the breaker points 254 and 255 when functioning in their normal manner. It will now be observed that the E. M. F. from battery 252' is bucking the E. M. F. derived from the voltage divider. This voltage divider, which includes the resistors 260 and 261, is included for the purpose of providing in the circuit, which includes the meter 6 and plate 66 and cathode 68, a voltage less than that of battery 252' and less than that appearing across the breaker points 254 and 255, when open. The battery 252' yields 6 volts. When the breaker points 254 and 255 are open, the larger voltage of battery 252' opposes the smaller voltage from the voltage divider and the net result would be a voltage equal to the difference but in the reverse direction except for the fact that tube 65 prevents flow in the reverse direction, wherefore the meter reading is reduced to zero. Whenever the breaker points 254 and 255 are closed, the battery 252' is confined to the ignition circuit with the result that the meter 6 shows a full scale reading under the voltage derived from the voltage divider. The scale band of the meter may be graduated in percentage of point dwell—being 100 per cent when the breaker points are closed all the time. With the engine running, the breaker points, of course, open and close and the meter current flows intermittently. The meter 6 being heavily damped will integrate and measure the average value of the current which is directly proportional to the time that current is flowing and thus to the time that the breaker points are closed.

Referring now to the meter 7, this is used in connection with three test circuits as follows—a first circuit for testing the ignition coil, a second circuit for testing voltage and a third circuit for analyzing the exhaust gas from the engine. These test circuits disclose another embodiment of the invention by the interlocking of the several circuits so that only one can be operative at a time and so that some circuits dominate others.

Referring to Fig. 2, it will be seen that the space below meter 7 on panel 5 is marked off to show various appliances associated with each test circuit. For the coil test there is a receptacle 275 having sockets 276 and 277 adapted for connection by test leads, similar to 21 and 21' used in connection with the "point dwell" test, to the primary terminals of an ignition coil while on shelf 4. This receptacle and the plug on its test leads, like receptacle 16 and the plug used therewith, are so constructed that each test lead can be connected only with the proper socket. There are also sockets 278 and 279 adapted to receive plugs, which are similar to 14 shown in Fig. 9 and which are connected to high tension test leads, such as 15, adapted for connection to the secondary terminals of the ignition coil. Then there are switch handles 280 and 281, and a knob 282 rotatable to make an adjustment to be later described. In addition, there is mounted on the panel 5 so as to be visible through a window 283 therein, a standard breaker mechanism 284 including fixed and movable breaker points 285 and 286 which are actuated by a cam 287, fixed on the shaft 288 of, and driven by, an electric motor 289, as diagrammatically indicated in Fig. 18.

For the voltage test, there is simply a receptacle 290, like the receptacle 16, and having sockets 291 and 292 to receive prongs on test leads such as those shown at 21 and 21' in Fig. 8. The receptacle, and the plug engaged therewith, are irreversible so that it is insured that the proper terminals of the meter 7 will be connected to the proper terminals of whatever source of voltage is to be tested.

Figure 10:
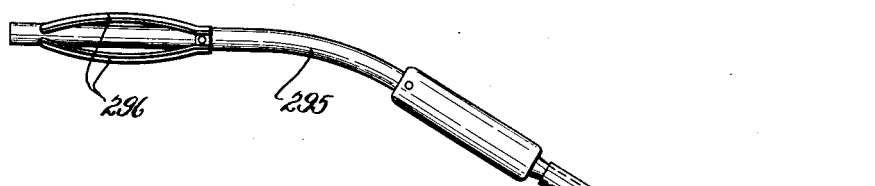
Figure 7:
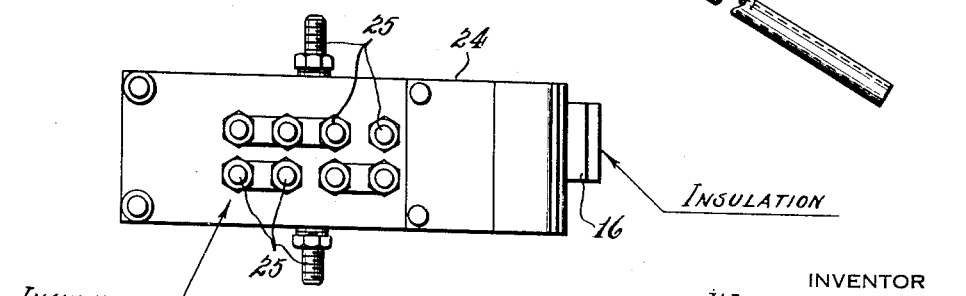

For the exhaust gas analyzer, there is a nipple 293, adapted for connection with one end of the rubber hose 294, shown in Fig. 10—the other end of this hose having a bent metal terminal 295, adapted for insertion into the exhaust pipe of the engine being tested and to be frictionally held therein by the springs 296. Above the nipple 293 is an adjusting screw 297. Above the latter a rotatable knob 298, adapted to be turned to either of the three positions indicated and which are, reading from left to right, "off," "adjust" and "test" positions. Above knob 298 is a similar rotatable knob 299.

The meter 7 is generally like the meter 6. In particular, it has three scale bands 300, 301 and 302 (Fig. 2) which are graduated appropriately for the coil test, voltmeter test and exhaust gas test, respectively. These scale bands 300, 301 and 302 are arranged with electric signal lamps 303, 304 and 305, respectively, in the same general manner shown in Fig. 3, in connection with meter 6.

Figure 18:
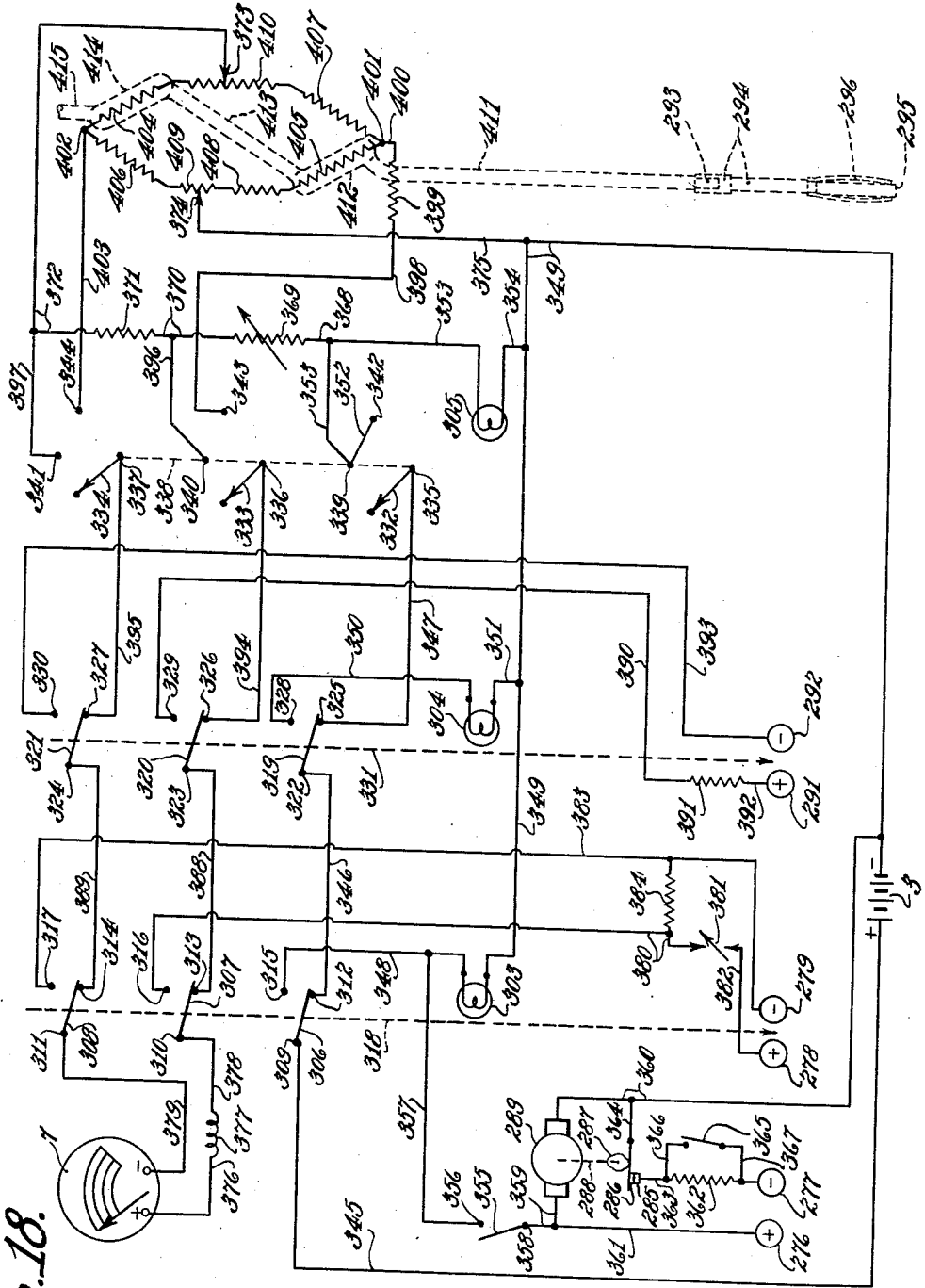
Fig. 18 is a wiring diagram showing another embodiment of the invention in three coordinated circuits for an ignition coil and secondary ignition circuit test, a voltage test and an exhaust gas test.

Referring now to Fig. 18, there is a gang switch for each of the three test circuits associated with meter 7. The gang switch for the ignition coil test circuit is represented diagrammatically by three pivoted switches 306, 307 and 308, having terminals 309, 310 and 311, respectively. These switches 306, 307 and 308 are movable from an "off" position, in which they respectively engage contacts 312, 313 and 314, to an "on" position, in which they respectively engage contacts 315, 316 and 317, respectively. These several switches are interconnected for simultaneous operation, as indicated by the dotted line 318, and they are adapted to be moved from "off" to "on" position, when the plug on one of the high tension test leads is thrust into the socket 278.

For the voltage test circuit, there is a gang switch represented by three pivoted switches 319, 320 and 321, having respective terminals 322, 323 and 324. These switches 319, 320 and 321 are movable from an "off" position, in which they respectively engage contacts 325, 326 and 327, to an "on" position, in which they respectively engage contacts 328, 329 and 330. These several switches are interconnected for simultaneous operation, as indicated by the dotted line 331, and they are adapted to be moved from "off" to "on" position, when the prongs on the plug on the test leads are thrust into sockets 291 and 292.

For the gas analyzer test, there is a gang switch represented by three pivoted switches 332, 333 and 334, having terminals 335, 336 and 337, respectively. These switches are interconnected for simultaneous operation, as indicated by the dotted line 338, and they are movable by turning the knob 298 on panel 5, from the "off" position shown to an "adjust" position, in which switches 332, 333 and 334 engage contacts 339, 340 and 341, respectively, and from the "adjust" position to a "test" position, in which switches 332, 333 and 334 engage contacts 342, 343 and 344, respectively.

The same battery 3, used for the test circuits associated with meter 6, may be used for the test circuits associated with meter 7. This battery is connected to the signal lamps as follows. The positive terminal of this battery is connected by a wire 345 to terminal 309 of switch 306. The contact 312 of this switch is connected by a wire 346 to the terminal 322 of switch 319 and the contact 325 of the latter is connected by a wire 347 to the terminal 335 of switch 322. The contact 315 of switch 306 is connected by a wire 348 to one terminal of signal lamp 303 and the other terminal thereof is connected to a return wire 349 leading to the negative terminal of battery 3. The contact 328 of switch 319 is connected by a wire 350 to one terminal of signal lamp 304 and the other terminal of the latter is connected by a wire 351 to return wire 349. The contacts 339 and 342 of switch 332 are interconnected by a conductor 352 and the contact 339 is connected by a wire 353 to one terminal of signal lamp 305— the other terminal of which is connected by a wire 354 to return wire 349.

The battery is also adapted to be connected to the electric motor 289, which operates the breaker mechanism 284 and periodically disengages and engages the breaker points 285 and 286, and to terminals 276 and 277 and thus to the primary of the ignition coil to be tested. These connections are made through a switch 355 adapted to be operated by the handle 280 described. The contact 356 of this switch is connected by a wire 357 to wire 348 and thus to contact 315 of switch 306 and, when switch 306 is closed, to the positive terminal of battery 3. The terminal 358 of switch 355 is connected by wire 359 to one terminal of motor 289 and the other terminal of the latter is connected by a wire 360 to the negative terminal of battery 3. Connected to wire 359 is a wire 361 leading to the socket 276 of receptacle 275. The socket 277 is connected to a resistor 362 and by a wire 363 to breaker point 285, and the mating breaker point 286 is connected by a wire 364 to wire 360 and thus to the negative terminal of battery 3. Resistor 362 is normally shunted out by a switch 365, the terminals of which are connected by wires 366 and 367 to opposite terminals of the resistor. By opening switch 365, resistance is introduced into the low tension ignition circuit to lower the voltage applied to the primary of the ignition coil and simulate a cold starting condition.

The battery 3 is also adapted to be connected to the exhaust gas analyzer test circuit. For this purpose, the interconnected contacts 342 and 339 of switch 332 are connected through a portion of wire 353 to a wire 368, which connects with a variable resistor 369. This resistor is connected by a wire 370 to a resistor 371. The latter is connected by a wire 372 to one input terminal 373 of the bridge circuit of the exhaust gas analyzer. The other input terminal 374 of the bridge circuit is connected by a wire 375 to wire 349 and thus to the negative terminal of battery 3.

The meter 7 has its positive terminal connected through a wire 376, choke coil 377 and a wire 378 to terminal 310 of switch 307 and its negative terminal is connected by a wire 379 to terminal 311 of switch 308. The upper terminals 316 and 317 of switches 307 and 308 are adapted to be connected to the secondary of the ignition coil to be tested. Thus, contact 316 is connected through a wire 380, a variable spark gap 381 and a wire 382 to positive socket 278. The contact 317 is connected by a wire 383 to socket 279. A resistor 384, of say 100 ohms, is bridged across the wires 380 and 383 and this resistor is a meter shunt, used to reduce the sensitivity of the meter so that a moderate reading is obtained. The variable spark gap 381 is adjustable by turning knob 282 on panel 5 and presence or absence of a spark across the gap may be observed through a window 385 on the panel 5. The knob 282 has a pointer 386 which plays over a suitably calibrated scale 387, which may for example be graduated in sixteenths of an inch of spark gap and in pounds per square inch compression of the fuel mixture which can be ignited by sparks of various lengths.

The meter 7 is connected to the voltmeter test circuit as follows. Wires 388 and 389 connect the lower contacts 313 and 314 of switches 307 and 308 to the terminals 323 and 324 of switches 320 and 321, respectively. The upper contact 329 of switch 320 is connected by a wire 390, a resistor 391 and a wire 392 to socket 291. The upper contact 330 of switch 321 is connected by a wire 393 to socket 292.

The meter 7 is also adapted for connection to the "adjust" and to the "test" circuits of the exhaust gas analyzer. The lower contacts 326 and 327 of switches 320 and 321 are connected by wires 394 and 395 to the terminals 336 and 337 of switches 333 and 334, respectively. The contacts 340 and 341 of switches 333 and 334 are connected by wires 396 and 397 to wires 370 and 372, respectively, and thus to the terminals of resistor 371. When switches 333 and 334 engage the "adjust" contacts 340 and 341, respectively, the meter 7 is connected to indicate the voltage drop across resistor 371 and this may be varied by adjustment of the variable resistor 369. The "test" contact 343 of switch 333 is connected by a wire 398, a resistor 399 and a wire 400 to one output terminal 401 of the bridge circuit of the exhaust gas analyzer. The other output terminal 402 of such bridge circuit is connected by a wire 403 to the "test" contact 344 of switch 334.

The exhaust gas analyzer consists essentially of a Wheatstone bridge in which two opposite resistors 404 and 405 are constructed of resistance wire, having a relatively high positive temperature coefficient of resistance, while the other two opposite resistors 406 and 407 are constructed of resistance wire having a temperature coefficient of resistance of substantially zero. One terminal of each of the resistors 404 and 406 are connected to output terminal 402 and one terminal of each of resistors 405 and 407 are connected to output terminal 401. The other terminals of resistors 405 and 406 are connected together through a resistor 408 and a variable resistor 409—the latter having connection with input terminal 374. The other terminals of resistors 404 and 407 are interconnected by a variable resistor 410, having connection with the input terminal 373. One of the variable resistors, say 409, is for a manufacturing adjustment while the other is adjustable by screw 297. Exhaust gas, from the engine being tested, is conducted through the tubes 295 and 294 to nipple 293, which is located at the outlet of a conduit 411 and delivers into the inlet of a chamber 412 surrounding resistor 405. The outlet of chamber 412 is connected by a conduit 413 to the inlet of a chamber 414, which surrounds the resistor 404 and the outlet of which is connected to an exhaust pipe 415. The resistors 404 and 405 are initially heated to incandescence. This is accomplished by adjustment of the variable resistor 369, while the switches 333 and 334 are in "adjust" position. The meter 7 then serves as an ammeter and measures the current flow in the input circuit. By reference to the meter 7, the current can be adjusted to some predetermined value. The exhaust gas is used to cool the resistors 404 and 405 and the cooling effect increases with the percentage of $CO_2$ in the gas. The meter 7, when switches 333 and 334 are in their "test" positions, is connected to the output terminals of the bridge circuit for the purpose of showing the degree of unbalance therein. The resistors 408, 409 and 410 are for introducing a certain initial amount of unbalance into the bridge circuit for the purpose of bringing the needle of meter 7 to some desired predetermined initial position on scale 302. Then, when resistors 404 and 405 are cooled by the exhaust gas, their resistances are decreased to increase the degree of unbalance in the bridge circuit and this is reflected by movement of the needle of the meter 7 from its initial position to various other positions proportional to the percentage of $CO_2$ in the exhaust gas.

The coil test, voltmeter test and exhaust gas test circuits are interlocked so that only one can be rendered operable at one time. The interlocking arrangements will now be explained. Assume that the high tension test leads have been inserted in sockets 278 and 279 of the coil test apparatus, the gang switch, comprising the switches 306, 307 and 308, will be moved to engage their respective contacts 315, 316 and 317. These switches are thus operated by the insertion of a plug in the positive socket 278. The insertion of leads in the sockets 276 and 277 of receptacle 275 is not necessary in order to make the coil test operative because these leads are not used, when the ignition coil is tested while in place in the automobile, but only when the coil is tested while on the shelf 4. The actuation of the condenser test gang switch will light the signal lamp 303 through a circuit from battery 3 comprising wire 345, terminal 309, switch 306, contact 315, wire 348, lamp 303 and wire 349. Neither signal lamp 304 or 305 can be lighted because the battery circuit to them is broken by the disengagement of switch 306 from contact 312. The meter 7 is connected in circuit with the terminals 278 and 279 and cannot be connected to either of the other test circuits because the switches 307 and 308 have been disengaged from contacts 313 and 314, respectively. If the ignition coil is to be tested while on the shelf 4, the switch 355 is closed to operate the motor 289 and drive the breaker mechanism 284 and to connect the battery 3 in circuit with the primary of the ignition coil through test leads inserted in the sockets 276 and 277. The switch 306 controls the battery supply to the primary of the ignition coil and to the motor 289 in the same way as it controls the supply to the signal lamp 303.

Now assume that the operator attempts to make the voltmeter test by plugging test leads into the sockets 291 and 292 before the test leads have been withdrawn from sockets 278 and 279, the engagement of switches 319, 320 and 321 with contacts 328, 329 and 330 will not serve to connect the battery 3 and meter 7 to the voltmeter test circuit because the battery circuit is broken by the separation of switch 306 and contact 312 and the circuit to meter 7 is broken by the separation of switches 307 and 308 from their respective contacts 313 and 314. So also, if one attempts to make the exhaust gas test by turning switches 332, 333 and 334 to either "adjust" or "test" position before the coil test is disconnected, the battery and meter circuits will be broken by the switches 306, 307 and 308, as above described. It will be clear that the coil test dominates the voltmeter and exhaust gas tests and that neither can be made operative until the coil test has been rendered inoperative.

The coil test will be rendered inoperative by withdrawing the positive test lead from socket 278. This will cause the switches 306, 307 and 308 to engage contacts 312, 313 and 314, whereby the battery and meter will be cut off from the coil test circuit and the signal lamp 303 extinguished.

If now, one inserts the prongs of the plug test leads in the sockets 291 and 292, the gang switch for the voltmeter test will be moved to "on" position and contacts 328, 329 and 330 will be engaged by their respective switches 319, 320 and 321. The signal lamp 304 will be lighted by this circuit, viz., from battery 3 by wire 345, terminal 309, switch 306, contact 312, wire 346, terminal 322, switch 319, contact 328, wire 350, lamp 304, and wires 351 and 349 back to the battery. Also, meter 7 will be connected to the sockets 291 and 292 by a circuit, which may be traced as follows—from socket 291 by wire 392, resistor 391, wire 390, contact 329, switch 320, terminal 323, wire 388, contact 313, switch 307, terminal 310, wire 378, choke coil 377, wire 376, to the positive terminal of the meter and from the negative terminal of the latter by wire 379, terminal 311, switch 308, contact 314, wire 389, terminal 324, switch 321, contact 330 and wire 393 to socket 292. If now one attempts to operate the exhaust gas test circuit without first rendering inoperative the voltmeter test circuit, the former will be inoperative because the circuit from the battery to the signal lamp 305 and to the bridge circuit of the exhaust gas analyzer is broken by the disengagement of switch 319 from contact 325 and the circuit from meter 7 to the bridge circuit is broken by the disengagement of switches 320 and 321 from contacts 326 and 327, respectively. Thus, the voltmeter test circuit dominates the exhaust gas test circuit and the latter cannot be rendered operative without first rendering the voltmeter test circuit inoperative. However, if before the voltmeter test circuit is rendered inoperative, one inserts the plug of a test lead in socket 278 of the coil test apparatus, then the coil test circuits are rendered operative notwithstanding that the gang switch for the voltmeter test circuit remains in "on" position. The switch 306 leaves contact 312 and disconnects the positive terminal of the battery from the battery switch 319 of the voltmeter test circuit and causes the signal lamp 304 to be extinguished. Also, the switches 307 and 308 leave their respective contacts 313 and 314 and cut the meter 7 off from the meter switches 320 and 321 of the voltmeter test circuit. At the same time, the engagement of switch 306 with contact 315 will connect the battery 3 to the coil test circuit and light the signal lamp 303, and the engagement of switches 307 and 308 with their respective contacts 316 and 317 will connect the meter 7 to the coil test circuit, all as heretofore described.

If both the coil test and voltmeter test circuits have been rendered inoperative, then the exhaust gas analyzer may be rendered operative by turning knob 298 to move switches 332, 333 and 334 to either their "adjust" or "test" positions. The signal lamp 305 will then be lighted by a circuit from the positive terminal of battery 3 by wire 345, terminal 309, switch 306, contact 312, wire 346, terminal 322, switch 319, contact 325, wire 347, terminal 335, switch 332, contact 339 or 342 (which are interconnected), wire 353, lamp 305, and wires 354 and 349 to the negative terminal of the battery. So also, the battery is connected to the bridge circuit of the exhaust gas analyzer by a circuit which is the same up to and through switch 332 and the wire 353, and thence by a wire 368, variable resistor 369, wire 370, resistor 371, and wire 372 to the input terminal 373 of the bridge circuit, returning from the other input terminal 374 by wire 375 to wire 349 and thus to the negative terminal of the battery. The meter 7 is connected to the exhaust gas analyzer test circuit, when set in "adjust" position, by a circuit which may be traced as follows— from the positive terminal of the meter by wire 376, choke coil 377, wire 378, terminal 310, switch 307, contact 313, wire 388, terminal 323, switch 320, contact 326, wire 394, terminal 336, switch 333, contact 340, wire 396 and part of wire 370 to one side of resistor 371 and from the other side of the latter by wire 372 as far as wire 397, to the left by wire 397, contact 341, switch 334, terminal 337, wire 395, contact 327, switch 321, terminal 324, wire 389, contact 314, switch 308, terminal 311, and wire 379 to the negative terminal of the meter. When knob 298 is turned to "test" position, the meter 7 is connected to the output terminals 400 and 402 of the bridge circuit by a circuit, which is the same as that just traced for "adjust" position from the positive terminal of the meter to and through switch 333 and thence to contact 343, wire 398, resistor 399 and wire 400 to output terminal 401 of the bridge circuit and from output terminal 402 by wire 403 to contact 344, thence through switch 334 and to the negative terminal of meter 7 by the same circuit as was traced for "adjust" position.

The exhaust gas analyzer test circuit is dominated by both of the other test circuits. Thus, if one moves the gang switch of the voltmeter test circuit to "on" position, the battery supply to the signal lamp 305 and to the bridge circuit will be broken by the switch 319, when it disengages from contact 325. Also, the switches 320 and 321 will cut off the meter 7 from the exhaust gas analyzer test circuit, when they disengage from their respective contacts 326 and 327. If while the exhaust gas analyzer test circuit is operative and the voltmeter test circuit is inoperative, one moves the gang switch for the coil test circuit to "on" position, the movement of switch 306 away from contact 312 will cut off the battery 3 from the bridge circuit of the exhaust gas analyzer test circuit and also from the signal lamp 305. Also, the meter 7 will be cut off from such bridge circuit by the movement of switches 307 and 308 away from their respective contacts 313 and 314.

It will thus be seen that only one of the three test circuits associated with meter 7 can be operated at a time. If while one test circuit is in operative position, one attempts to render another test circuit operative, the operation of the second circuit will either be prevented or the first circuit will be disabled, according to whether the second circuit is dominated by the first or vice versa. In no case can two test circuits be made operative at the same time.

There is also the relation in the system of the lamp circuits to one another and to the test circuits. In the system a lamp circuit cannot be energized to signal a particular meter scale unless its corresponding test circuit is established to use for measuring on that particular scale. The test circuits to be measured by one meter are interlocked to provide for a predetermined manner of using the test circuits one by one. Making the normal hand switching operation, which tends to establish the dominating one of the group, that one will be established. If, for example, any other test circuit as previously established has not been disconnected by hand, such other test circuit and its signaling circuit will be disconnected automatically, when the dominating test circuit and its signaling circuit is established. An advantage of the system is that regardless of an attendant's inadvertence, only one test circuit can be established or signals for reading on the one meter at one time and that one test circuit must be either the dominating one unconditionally, or one of the dominated circuits on condition that any other relatively dominating circuit has been manually disconnected. In this way the attendant is forced to make his manual disconnections properly before he can successfully establish a test circuit for use. He cannot manually operate to establish either the test circuits with the meter or the corresponding lamp circuits for signaling until he operates one by one in the right order. Any mistakes are corrected by the automatic operation of the system in that the system will not operate in a disorderly manner.

It will be appreciated that the result gives the benefit of a high degree of "fool proof" operation, of means for protecting against disorder or damage to the test circuits and their instruments, of signaling only for the scale to read according to the condition of the apparatus. Of course in the construction of the apparatus much expense is saved in grouping the test circuits so they can to a substantial extent use costly instruments in common. This has been done as seen in the circuit diagrams beginning with the multi-scale meter for all circuits of one grouping and extending to the common use of other circuit instruments. The way of interlocking the test circuits and the corresponding signaling circuits and their relation to the meter scales of the group result in avoiding difficulties, particularly in the use of the apparatus. It is remarkably simple from the user's standpoint considering the complications of all the circuit elements and operations involved. This will be appreciated and be of real benefit to the workmen for whose help, particularly at filling stations, the invention is directed. It enables skilled work to be done with less skill required on the part of the workmen.

I claim:

1. In an electrical testing apparatus, a plurality of test circuits, a multi-scale meter common to the plurality of test circuits and operable when selectively switched into any one of such circuits to give its test reading, said meter having a plurality of light passing scale bands, one corresponding to each test circuit, a plurality of light shading receptacles behind, bordering on, and defining each scale band, a plurality of lamps, at least one corresponding to each test circuit, in the light shading receptacles, a source of electrical energy adapted for use severally with said test circuits and with said lamps, a plurality of lamp lighting circuits, a plurality of ganged selective multiple switches, in circuit with the meter and the test circuits to connect one or the other test circuit with the meter, each of said multiple switches including test circuit switches and lamp lighting switches and cut out switches, corresponding lamp and test circuit and cut out switches being adjacently disposed, a plurality of sets of receptacles for receiving external leads, one set for each test circuit, actuating means within each set of receptacles to simultaneously operate the corresponding adjacently disposed switches of one multiple switch including means, the test circuit of such multiple switch operable to energize its test circuit and the meter to register the test result, the lamp lighting switch operable to light its lamp and illuminate the corresponding meter scale band, and the cut out switch operable to disconnect other circuits, all for the purpose described.

2. In a testing system for determining three different conditions, an electrical input having first and second terminals, an electrical measuring instrument having at least three graduated scales calibrated in terms of the three different conditions to be determined, a first lamp and means for confining the illumination thereof to the first of said scales, a second lamp and means for confining the illumination thereof to the second of said scales, a third lamp and means for confining the illumination thereof to the third scales, a multiple pole throw switch having at least three poles, a first test apparatus operable to cooperate with the measuring instrument to determine the first condition comprising a socket into which wires may be inserted, means normally maintaining said multiple pole switch in a first position when the socket is empty including means for throwing the switch to a second position in response to insertion of members into said socket, said socket having two electrical terminals, a circuit including a resistor in series with said socket terminals, wires connecting said instrument across first and second poles of said switch, first and second contactors respectively engaged by said first and second poles when said switch is in said second position, means connecting said contactors across said resistor, a third contactor engaged by the third pole when it is in the second position, a wire connecting the first side of said source through said third pole and said third contactor to said first lamp, a second test apparatus operable with the measuring instrument to determine the second condition comprising a second multiple pole double throw switch, a second socket having terminals adapted to receive wires, means to maintain said second switch in a first position when said second socket is empty including means to move the second switch to a second position in response to insertion of members into said second socket, fourth and fifth contactors engaged respectively by the first and second poles of the second switch when the latter is in its second position, sixth and seventh contactors respectively engaged by the first and second poles of the first switch when the first switch is in its first position, wires connecting said sixth and seventh contactors to the first and second poles of the second switch, means connected to the terminals of the second socket and to the fourth and fifth contacts to apply potential across the fourth and fifth contacts according to the quantity to be measured which is applied to the terminals of the second socket, said second switch including a third pole, an eighth contactor engaged by the last-named third pole when the second switch is in its second position, a circuit for the second lamp including said source and said eighth contactor and said last-named third pole and a pole of the first switch and a contactor of the last-named pole which is engaged by the last-named pole only when the first switch is in its first position, a third test apparatus operable when connected to the measuring instrument to indicate the third condition, a ninth contact member associated with the first pole of the second switch and engaged thereby only when said second switch is in its first position, a metering circuit for the third test apparatus and for connecting the latter across said instrument, said metering circuit extending from one side of the instrument through the first pole of the first switch and the sixth contactor and the first pole of the second switch and the ninth contactor, a switch operable to three positions the first of which positions is an "off" position, means to connect said metering circuit to the third test apparatus to measure different quantities respectively when the last-named switch is in the second and third of said three positions, a third lamp circuit for the third lamp and including said input, means for breaking the third lamp circuit when the last-named switch is moved to its "off" position, said third lamp circuit extending through the first and second switches when they are in their first positions and interrupted when either of the first or second switches is moved to its second position.

3. In electrical testing apparatus, a source of current, a meter having a plurality of scales thereon, a lamp for illuminating one scale of said meter, a second lamp for illuminating another scale of the meter, a multiple pole double throw master switch movable to "on" and "off" positions, a contactor for each pole of the switch and means supporting said contactors to so position them that they are contacted by their complementary poles when the switch is in the "on" position and separated from such poles when the switch is in its "off" position, a contact member for each pole of the switch and means for supporting such contact members to so position them that they are contacted by their complementary poles when the switch is in the "off" position and separated from such poles when the switch is in its "on" position, a dominant test circuit, a circuit extending from the meter through first and second of said poles and their complementary contactors in the "on" position of the master switch to said dominant test circuit for connecting the meter to the dominant test circuit, a circuit extending from said source through a third pole and its complementary contactor of the master switch in the "on" position thereof to supply potential to the dominant test circuit, a lamp circuit extending from said source through said third pole and its complementary contactor in the "on" position of the master switch to energize one lamp, a subservient test circuit, a multiple pole double throw sub-master switch having at least three poles movable to "on" and "off" positions, a contactor for each pole of the sub-master switch and means supporting such contactors that they are contacted by their complementary poles in the sub-master switch when the latter is in its "on" position, a contact member for each pole of the sub-master switch and means for supporting such contact members to so position them that they are contacted by their complementary poles when the sub-master switch is in its "off" position, a circuit extending through some of the poles of the sub-master switch and their complementary contactors in the "on" position thereof and through the first and second named poles and contact members of the master switch in the "off" position thereof to connect said meter to the subservient test circuit, a potential circuit extending from said source through a pole and its complementary contact member of the master switch in the "off" position thereof and through a pole and its complementary contactor of the sub-master switch to the subservient test circuit for applying voltage thereto only in the "off" position of the master switch and the "on" position of the sub-master switch, a second lamp circuit extending from said source through a pole and its complementary contact member of the master switch in the "off" position thereof and through a pole and its complementary contactor of the sub-master switch to the subservient test circuit for applying voltage thereto only in the "off" position of the master switch and the "on" position of the sub-master switch, and a second lamp circuit extending from said source through a pole and its complementary contact member of the master switch in the "off" position thereof and through a pole and its complementary contactor of the sub-master switch in the "on" position thereof to same lamp for illuminating the other scale of the meter.

4. Apparatus according to claim 3 in which the dominant test circuit has an input and the subservient test circuit has an input, first and second sockets for the respective inputs, means responsive to insertion of a plug in the first socket to move the master switch to its "on" position and to removal of such plug to move the master switch to its "off" position, means responsive to insertion of a plug in the second socket to move the sub-master switch to its "on" position and to the removal of such plug to move the sub-master switch to its "off" position, and said sockets having different arrangements of socket openings whereby a plug complementary to one of the sockets will not fit the other socket.

5. In an electrical testing apparatus for measuring three different conditions, a source of electric current, an electrical measuring instrument, a dominant electrical test circuit, a master double throw switch having a plurality of contact members constituting poles and movable as a group to "on" and "off" positions, complementary contactors for said contact members when the switch is in the "on" position and engaged by said contact members only in such "on" position, a first circuit extending through first and second of said contact members and their complementary contactors in the "on" position of said master switch to connect the electrical measuring instrument to the dominant test circuit, a second circuit extending from said source through another contact member and its complementary contactor when the master switch is in the "on" position thereof to supply potential to the dominant test circuit, other complementary contactors for said contact members when the master switch is in the "off" position thereof and engaged by said contact members only in such "off" position, a sub-master double throw switch having a plurality of contact elements constituting poles and movable as a group to "on" and "off" positions, complementary contactors for the contact elements of the sub-master switch in the "on" position and engaged by said contact elements only in such "on" position, a third circuit extending through first and second of the contact elements and their said complementary contactors of the sub-master switch in the "on" position thereof and through the first and second contact members of the master switch and their complementary contactors in the "off" position thereof to thereby connect said electrical measuring instrument to the subservient electrical test circuit, a fourth circuit extending from said source through a third contact member of the master switch and through a contactor of the last-named contact member which is complementary thereto and engaged thereby when the master switch is in the "off" position and through a third contact element of the sub-master switch in the "on" position thereof as well as through the contactor of the sub-master switch which is complementary to said third contact element and engaged thereby in the "on" position thereof, said fourth circuit including the subservient test circuit for applying potential thereto, a third electrical test circuit, a minor switch having a plurality of contact devices constituting poles and movable to "off" and "on" positions, complementary contactors for the poles of the minor switch and respectively engaged by said poles in the "on" position, other complementary contactors for the poles of the minor switch and respectively engaged by said poles in the "off" position, a fifth circuit extending from the electrical measuring instrument through first and second contact members of the master switch in "off" position thereof and through the contactors of the first and second contact members which are engaged thereby when the master switch is in its "off" position as well as through the first and second contact elements of the sub-master switch in the "off" position thereof and through contactors of the sub-master switch which are engaged by said first and second contact elements in the "off" position and through first and second contact devices and their complementary "on" contactors of the minor switch, said fifth circuit including the third test circuit bridged across the last two named contactors, a sixth circuit connected across said source extending through the third contact member and its complementary "off" contactor of the master switch and through a contact element of the sub-master switch and the complementary contactor of such element in the "off" position of the sub-master switch and through one of the contact devices and its complementary contactor for the "on" position of the minor switch to the third test circuit to apply potential thereto.

WILLIAM W. LOGAN.

REFERENCES CITED

The following references are of record in the file of this patent:

UNITED STATES PATENTS

| Number | Name | Date |
|---|---|---|
| 1,335,646 | Bierbower | Mar. 30, 1920 |
| 1,348,424 | Johnson | Aug. 3, 1920 |
| 1,528,962 | Woehlke | Mar. 10, 1925 |
| 1,593,024 | Macadie | July 20, 1926 |
| 1,636,743 | Jacobson | July 26, 1927 |
| 1,825,978 | Philbrick | Oct. 6, 1931 |
| 1,949,634 | Simpson | Mar. 6, 1934 |
| 2,038,241 | Scofield | Apr. 21, 1936 |
| 2,071,279 | Brick | Feb. 16, 1937 |
| 2,089,917 | Mitchell | Aug. 10, 1937 |
| 2,096,131 | Oestermeyer | Oct. 19, 1937 |
| 2,102,185 | Morgan et al. | Dec. 14, 1937 |
| 2,125,840 | Brooks et al. | Aug. 2, 1938 |
| 2,132,094 | Brodton | Oct. 4, 1938 |
| 2,466,558 | Sadlon | Apr. 5, 1949 |

FOREIGN PATENTS

| Number | Country | Date |
|---|---|---|
| 364,050 | Italy | Oct. 20, 1938 |